United States Patent [19]

Fujita et al.

[11] Patent Number: 5,021,504

[45] Date of Patent: Jun. 4, 1991

[54] THERMOPLASTIC POLYOLEFIN-POLYCARBONATE COMPOSITION

[75] Inventors: Yuuji Fujita; Tadashi Sezume; Kitsusho Kitano, all of Ooi; Kiyotada Narukawa, Tokorozawa; Takashi Mikami, Komae; Tetsuya Kawamura, Tokyo; Shigeru Sato, Ooi; Takeyoshi Nishio, Okazaki; Toshio Yokoi; Takao Nomura, both of Toyota, all of Japan

[73] Assignees: Tonen Sekiyukagaku Kabushiki Kaisha, Tokyo; Toyota Jidosha Kabushiki Kaisha, Aichi, both of Japan

[21] Appl. No.: 247,015

[22] Filed: Sep. 19, 1988

[30] Foreign Application Priority Data

| Sep. 17, 1987 | [JP] | Japan | 62-234277 |
| Sep. 17, 1987 | [JP] | Japan | 62-234278 |
| Sep. 17, 1987 | [JP] | Japan | 62-234279 |
| Sep. 17, 1987 | [JP] | Japan | 62-234280 |
| Sep. 17, 1987 | [JP] | Japan | 62-234281 |
| Sep. 17, 1987 | [JP] | Japan | 62-234282 |
| Sep. 17, 1987 | [JP] | Japan | 62-234283 |
| Sep. 17, 1987 | [JP] | Japan | 62-234284 |
| Sep. 17, 1987 | [JP] | Japan | 62-234285 |

[51] Int. Cl.$^5$ .................. C08L 69/00; C08L 23/10
[52] U.S. Cl. ...................... 525/57; 525/67; 525/89; 525/92; 525/133; 525/146; 525/148
[58] Field of Search .......... 525/92, 67, 89, 146, 525/148, 468, 57, 133

[56] References Cited

U.S. PATENT DOCUMENTS

| 4,102,854 | 7/1978 | Gergen | 525/92 |
| 4,481,331 | 11/1984 | Liu | 525/146 |
| 4,520,164 | 5/1985 | Liu | 525/67 |
| 4,532,282 | 7/1985 | Liu et al. | 524/157 |
| 4,550,138 | 10/1985 | Paddock et al. | 525/67 |
| 4,564,655 | 1/1986 | Liu | 525/92 |
| 4,568,723 | 2/1986 | Lu | 525/92 |
| 4,579,910 | 4/1986 | Giles, Jr. et al. | 525/148 |
| 4,638,033 | 1/1987 | Boutni | 525/146 |
| 4,792,477 | 12/1988 | Ochiumi | 428/216 |

FOREIGN PATENT DOCUMENTS

| 51-24540 | 7/1973 | Japan . |
| 49-76948 | 7/1974 | Japan . |
| 51-41145 | 8/1975 | Japan . |
| 56-76449 | 6/1981 | Japan . |
| 57-108151 | 7/1982 | Japan . |
| 57-108152 | 7/1982 | Japan . |
| 57-111351 | 7/1982 | Japan . |
| 59-133247 | 7/1984 | Japan . |
| 59-196360 | 11/1984 | Japan . |
| 60-233151 | 11/1985 | Japan . |
| 61-115945 | 6/1986 | Japan . |
| 61-120852 | 6/1986 | Japan . |
| 61-159447 | 7/1986 | Japan . |
| 61-215649 | 9/1986 | Japan . |
| 61-225245 | 10/1986 | Japan . |
| 61-235456 | 10/1986 | Japan . |
| 61-238847 | 10/1986 | Japan . |

*Primary Examiner*—John C. Bleutge
*Assistant Examiner*—David Buttner
*Attorney, Agent, or Firm*—Finnegan, Henderson, Farabow, Garrett & Dunner

[57] ABSTRACT

A thermoplastic resin composition having well-balanced properties which comprises 95-5 weight % of polycarbonate, 5-95 weight % of polyolefin and a particular combination of additional components selected from a styrene-ethylene.propylene copolymer, a styrene-ethylene. butyrene-styrene block copolymer, an AES resin, a styrene-olefin block copolymer, an unsaturated carboxylic acid-modified polyolefin, polybutylene terephthalate, a styrene-maleic anhydride copolymer, an oxazoline ring-containing styrene copolymer a saponified olefin-vinyl ester copolymer and an epoxy group-containing styrene copolymer.

58 Claims, No Drawings

THERMOPLASTIC POLYOLEFIN-POLYCARBONATE COMPOSITION

BACKGROUND OF THE INVENTION

The present invention relates to a thermoplastic resin composition with good mechanical strength, impact resistance, thermal deformation resistance, moldability and chemical resistance comprising crystalline polyolefin, polycarbonate and additive components.

Aromatic polycarbonates have excellent impact strength, heat resistance, rigidity and dimension stability, but they are poor in solvent resistance and moldability. To overcome these problems, attempts have been made to provide polycarbonate compositions with polyolefins. However, since polyolefins and polycarbonates do not have good compatibility, proposals have been made to add various third components to improve their compatibility.

Japanese Patent Laid-Open No. 57-108151 discloses a polycarbonate resin composition comprising 100 parts by weight of a polycarbonate resin, 0.3-20 parts by weight of polyethylene and 0.3-20 parts by weight of a butyl rubber.

Japanese Patent Laid-Open No. 57-108152 discloses a polycarbonate resin composition comprising 0.3-20 parts by weight of an ethylene-propylene copolymer and/or an ethylene-propylene-diene copolymer as a third component.

Japanese Patent Laid-Open No. 57-111351 discloses a polycarbonate resin composition comprising 0.3-20 parts by weight of an isoprene rubber and/or a methylpentene polymer as a third component.

Any of these polycarbonate resin compositions, however, suffers from drastic decrease in impact strength when polyethylene content exceeds 10 %, resulting in the surface peel of molded products.

Further, there are various proposals in adding third components. For instance, Japanese Patent Laid-Open Nos. 56-76449 and 59-133247 disclose thermoplastic resin compositions comprising polycarbonate, polyolefin and an ABS resin. However, the ABS resin do not have sufficient effects of increasing compatibility, so when polyolefin exceeds 10 %, the thermoplastic resin compositions lose mechanical strength.

Japanese Patent Laid-Open No. 59-196360 discloses a polycarbonate resin composition comprising as a third component a copolymer of at least one olefin and an acrylate, methacrylate, acrylic acid or methacrylic acid monomer, for instance, an ethylene-ethyl acrylate copolymer (EEA resin).

Japanese Patent Laid-Open No. 61-215649 discloses a polycarbonate resin composition comprising as a third component an olefin-vinyl ester copolymer, for instance, an ethylene-vinyl acetate copolymer (EVA resin), etc.

However, these compositions also suffer from decrease in impact strength due to the decrease in compatibility when the amount of polyolefin nears that of polycarbonate.

Japanese Patent Laid-Open No. 61-115945 discloses a composition comprising a styrene-ethylene-butylene-styrene block copolymer (SEBS resin) as a third component. However, the addition of the SEBS resin fails to provide sufficient rigidity, thermal deformation resistance, impact strength, surface peel resistance, etc., though the compatibility is slightly improved.

Japanese Patent Publication Nos. 51-24540 and 51-41145 and Japanese Patent Laid-Open No. 60-233151 disclose thermoplastic resin compositions comprising polycarbonate and a graft copolymer produced by grafting a styrene monomer and acrylonitrile monomer to an ethylene-propylene-diene copolymer (AES resin). However, since none of these thermoplastic resin compositions contains polyolefin, they are poor in moldability.

In addition, Japanese Patent Laid-Open Nos. 61-159447, 61-120852, 61-225245, 61-235456 and 61-238847 disclose compositions comprising aromatic polycarbonate, polyester and/or modified polyolefin, etc. Further, Japanese Patent Laid-Open No. 49-76948 discloses a thermoplastic resin composition comprising polycarbonate and a styrene-maleic anhydride copolymer. However, since no polyolefin is contained in these compositions, they are poor in solvent resistance.

As described above, although thermoplastic resin compositions based on polycarbonate and polyolefin whose compatibility is improved to have an excellent balance of mechanical strength, moldability and solvent resistance are desired particularly for automobile parts, etc., satisfactory compositions have never been provided.

OBJECT AND SUMMARY OF THE INVENTION

An object of the present invention is, therefore, to increase the compatibility between polycarbonate and polyolefin, thereby not only improving impact strength, thermal deformation resistance, moldability and chemical resistance but also preventing surface peel.

Another object of the present invention is to provide a polycarbonate resin composition having a well-balanced combination of mechanical strength, moldability, solvent resistance, etc. with improved compatibility between polycarbonate and polyolefin.

As a result of intense research in view of the above objects, it has been found that particular additive components as described below can drastically improve the compatibility between polycarbonate and polyolefin, thereby providing thermoplastic resin compositions with excellent mechanical strength, impact resistance, thermal deformation resistance, moldability, solvent resistance, etc. The present invention has been completed based on this finding.

The thermoplastic resin composition according to a first embodiment of the present invention comprises (a) 95-5 weight % of crystalline polyolefin, (b) 5-95 weight % of polycarbonate, and (c) 5-100 parts by weight, per 100 parts by weight of said (a) + said (b), of a styrene-ethylene-propylene block copolymer.

The thermoplastic resin composition according to a second embodiment of the present invention comprises (a) 95-5 weight % of crystalline polyolefin, (b) 5-95 weight % of polycarbonate, (c) a styrene-ethylene butylene-styrene block copolymer, and (d) a low-crystallinity ethylene-α-olefin copolymer, said (c) + said (d) being 5-100 parts by weight per 100 parts by weight of said (a) + said (b), and a weight ratio of said (c) to said (d) being 30/70-95/5.

The thermoplastic resin composition according to a third embodiment of the present invention comprises (a) 95-5 weight % of crystalline polyolefin, (b) 5-95 weight % of polycarbonate, and (c) 5-100 parts by weight, per 100 parts by weight of said (a) + said (b), of a graft copolymer composed of an ethylene-propylene-diene copolymer or an ethylene-propylene copolymer grafted with a styrene monomer and an acrylonitrile monomer.

The thermoplastic resin composition according to a fourth embodiment of the present invention comprises (a) 95-5 weight % of crystalline polyolefin, (b) 5-95 weight % of polycarbonate, (c) a graft copolymer composed of an ethylene-propylene-diene copolymer or an ethylene-propylene copolymer grafted with a styrene monomer and an acrylonitrile monomer, and (d) a styrene-olefin block copolymer, said (c) + said (d) being 5-100 parts by weight per 100 parts by weight of said (a) + said (b), and a weight ratio of said (c) to said (d) being 30/70-95/5.

The thermoplastic resin composition according to a fifth embodiment of the present invention comprises (a) 95-5 weight % of crystalline polyolefin, (b) 5-95 weight % of polycarbonate, and (c) 2-100 parts by weight, per 100 parts by weight of said (a) + said (b), of a modified polyolefin, and (d) 2-100 parts by weight, per 100 parts by weight of said (a) + said (b), of polybutylene terephthalate.

The thermoplastic resin composition according to a sixth embodiment of the present invention comprises (a) 95-5 weight % of crystalline polyolefin, (b) 5-95 weight % of polycarbonate, (c) 2-100 parts by weight, per 100 parts by weight of said (a) + said (b), of a styrene-maleic anhydride copolymer, and (d) 2-20 parts by weight, per 100 parts by weight of said (a) + said (b), of a modified polyolefic containing an oxazoline ring.

The thermoplastic resin composition according to a seventh embodiment of the present invention comprises (a) 95-5 weight % of crystalline polyolefin, (b) 5-95 weight % of polycarbonate, (c) 2-30 parts by weight, per 100 parts by weight of said (a) + said (b), of a modified polyolefin, and (d) 2-30 parts by weight, per 100 parts by weight of said (a) + said (b), of a modified polyolefin containing an oxazoline ring.

The thermoplastic resin composition according to a eighth embodiment of the present invention comprises (a) 95-5 weight % of crystalline polyolefin, (b) 5-95 weight % of polycarbonate, (c) 2-30 parts by weight, per 100 parts by weight of said (a) + said (b), of a modified polyolefin, and (d) 2-100 parts by weight, per 100 parts by weight of said (a) + said (b), of a saponified olefin-vinyl ester copolymer.

The thermoplastic resin composition according to a ninth embodiment of the present invention comprises (a) 95-5 weight % of crystalline polyolefin, (b) 5-95 weight % of polycarbonate, (c) 2-30 parts by weight, per 100 parts by weight of said (a) + said (b), of a modified polyolefin, and (d) 2-30 parts by weight, per 100 parts by weight of said (a) + said (b), of an epoxy group-containing styrene copolymer.

DETAILED DESCRIPTION OF THE INVENTION

Polycarbonates, particularly aromatic polycarbonates which can be used in the present invention may be produced by (a) a reaction between bivalent phenol and a carbonate precursor such as phosgene in the presence of an acid acceptor and a molecular weight modifier, or (b) a transesterification reaction between bivalent phenol and a carbonate precursor such as diphenyl carbonate. The bivalent phenols which can be used are preferably bisphenols, particularly 2,2-bis (4-hydroxyphenyl) propane (bisphenol A). Part or total of bisphenol A may be replaced by other bivalent phenols. The other bivalent phenols than bisphenol A include hydroquinone, 4,4'-dihydroxydiphenyl, bis (4-hydroxyphenyl) alkane, bis (4-hydroxyphenyl) cycloalkane, bis (4-hydroxyphenyl)sulfide, bis (4-hydroxyphenyl) sulfone, bis (4-hydroxyphenyl) sulfoxide, bis (4-hydroxyphenyl) ketone, bis (4-hydroxyphenyl) ether, etc. and halogenated bisphenols such as bis (3,5-dibromo-4-hydroxyphenyl) propane. Homopolymers or copolymers of these bivalent phenols or their mixtures may also be used. Such polycarbonate resins are commercially available.

The aromatic polycarbonate preferably has a weight-average molecular weight of 10,000-100,000. When it is less than 10,000, sufficient mechanical properties cannot be provided, and when it exceeds 100,000, the moldability decreases. The more preferable weight-average molecular weight is 20,000-50,000.

Crystalline polyolefins which can be used in the present invention include polyethylene, polypropylene, polybutene-1, poly-4-methylpentene-1 and other α-olefin polymers, and the preferred polyolefin is polypropylene. Incidentally, the polyolefin need not be a homopolymer. For instance, in the case of polypropylene, it may be a copolymer of propylene with up to 20 weight % of other one or more α-olefins. The preferred comonomers for the propylene copolymer include ethylene. The copolymers may be random copolymers, block copolymers or graft copolymers. The weight-average molecular weight of the polyolefin is 10,000-1,000,000, and preferably 30,000-300,000. Further, it has a melt flow rate (MFR) of 500-0.01 g/10 min at 230° C., and preferably 50-1 g/10 min.

When measured by an X-ray diffraction method, the polyolefin has a crystallinity of 20% or more. When the crystallinity is less than 20%, the resulting thermoplastic resin composition has low mechanical strength. The preferred crystallinity is 40 % or more.

In the present invention, a weight ratio of the crystalline polyolefin to the polycarbonate is 95-5% to 5-95%. When the polycarbonate is less than 5 weight %, sufficient impact strength and mechanical strength cannot be obtained, and when it exceeds 95 weight %, the moldability and the solvent resistance decrease. Preferably, the polyolefin is 90-10 weight %, and the polycarbonate is 10-90 weight %. More preferably, the polyolefin is 80-20 weight %, and the polycarbonate is 20-80 weight %.

In the first embodiment of the present invention, the styrene-ethylene-propylene block copolymer is a block copolymer composed of a styrene moiety and an ethylene-propylene moiety both in the form of blocks. A styrene/ethylene-propylene weight ratio in the styrene-ethylene-propylene block copolymer is 15/85-70/30. When it is less than 15/85, sufficient mechanical strength cannot be obtained, and when it exceeds 70/30, the resulting thermoplastic resin composition becomes brittle. The preferred styrene/ethylene-propylene weight ratio is 20/80-50/50. Further, the styrene-ethylene-propylene block copolymer has a weight-average molecular weight of 10,000-1,000,000. When it is less than 10,000, sufficient mechanical strength cannot be obtained, and when it exceeds 1,000,000, good dispersion of the styrene-ethylene-propylene block copolymer in the composition cannot be achieved.

The styrene-ethylene-propylene block copolymer can be prepared by first producing a styrene-isoprene block copolymer and then hydrogenating unsaturated bonds of isoprene. The styrene-isoprene block copolymer can be prepared by a usual anion living polymerization method, and its hydrogenation can be conducted by using a hydrogenation catalyst such as a nickel catalyst carried on a diatomaceous earth. However, it should be noted that styrene-ethylene-propylene block copolymers produced by any other methods can be used in the present invention.

The amount of the styrene-ethylene-propylene block copolymer added is 5-100 parts by weight per 100 parts by weight of the crystalline polyolefin + the polycarbonate. When it is less than 5 parts by weight, the resulting thermoplastic resin composition has insufficient impact resistance, surface peel resistance and mechanical strength, and when it exceeds 100 parts by weight, the rigidity of the composition decreases dramatically, making the composition unusable in practical applications. The preferred amount of the styrene-ethylene-propylene block copolymer is 10-50 parts by weight, and the more preferable amount is 15-40 parts by weight.

The thermoplastic resin composition according to the second embodiment of the present invention is characterized by comprising the styrene-ethylene-butylene-styrene block copolymer and the low-crystallinity ethylene-α-olefin copolymer as third and fourth components.

The styrene-ethylene-butylene-styrene block copolymer is a block copolymer composed of a styrene moiety and an ethylene-butylene moiety both in the form of blocks. A weight ratio of styrene/ethylene-butylene in the styrene-ethylene-butylene-styrene block copolymer is 10/90-70/30. When it is less than 10/90, sufficient mechanical strength cannot be obtained, and when it exceeds 70/30, the resulting thermoplastic resin composition becomes brittle. The preferred styrene/ethylene-butylene weight ratio is 20/80-50/50. Further, the styrene-ethylene-butylene-styrene block copolymer has a weight-average molecular weight of 10,000-1,000,000. When it is less than 10,000, sufficient mechanical strength cannot be obtained, and when it exceeds 1,000,000, good dispersion of the styrene-ethylene-butylene-styrene block copolymer in the composition cannot be achieved. Incidentally, the styrene moiety is not limited to that composed only of styrene, but may be made of substituted styrene such as methylstyrene.

The styrene-ethylene-butylene-styrene block copolymer can be produced by methods disclosed in U.S. Pat. Nos. 3,595,942 and 4,188,432. Specifically, a styrene-butadiene-styrene block copolymer is treated at a temperature of 25-175° C. in the presence of a catalyst composed of a cobalt or nickel alkoxide reduced by an alkyl aluminum compound to selectively hydrogenate the butadiene moiety, thereby converting it to a structure corresponding to an ethylene-butene-1 copolymer. Incidentally, the styrene-ethylene-butylene-styrene block copolymer produced any other methods can be used in the present invention.

The low-crystallinity ethylene-α-olefin copolymer is a copolymer of ethylene and α-olefins such as propylene, butylene, pentene, etc. and particularly preferable low-crystallinity ethylene-α-olefin copolymers are an ethylene-propylene rubber and an ethylene-butylene rubber. A weight ratio of ethylene to α-olefin is 20:80-85:15. When it is less than 20:80 or when it exceeds 85:15, the elasticity is decreased. The preferred ethylene/α-olefin weight ratio is 30:70-70:30. Incidentally, it should be noted that the low-crystallinity ethylene-α-olefin copolymer may contain two or more types of α-olefins.

The low-crystallinity ethylene-α-olefin copolymer has a weight-average molecular weight of 30,000-1,000,000. When it is less than 30,000, the resulting composition does not have sufficient strength, and when it exceeds 1,000,000, good dispersion of the low-crystallinity ethylene-α-olefin copolymer cannot be achieved. The preferred weight-average molecular weight is 50,000-200,000. Further, it has a crystallinity of 20% or less when measured by an X-ray diffraction method. The preferred crystallinity is 0-10%. In addition, it has a melt flow rate (MFR) of 0.01-50 g/10 min at 230° C., and preferably 0.1-20 g/10 min.

A total amount of the styrene-ethylene-butylene-styrene block copolymer and the low-crystallinity ethylene-α-olefin copolymer is 5-100 parts by weight per 100 parts by weight of the crystalline polyolefin + the polycarbonate. When it is less than 5 parts by weight, the resulting thermoplastic resin composition does not have sufficient impact resistance, surface peel resistance and mechanical strength, and when it exceeds 100 parts by weight, the rigidity of the composition decreases dramatically, making it unusable in practical applications. Preferably, the total amount is 10-50 parts by weight, and more preferably, it is 20-40 parts by weight.

A weight-ratio of the styrene-ethylene-butylene-styrene block copolymer to the low-crystallinity ethylene-α-olefin copolymer is 30:70-95:5. When it is less than 30:70, sufficient compatibility cannot be provided between the polyolefin and the polycarbonate, and when it exceeds 95:5, the surface peel resistance and the impact strength are lowered. The preferred weight ratio is 50:50-90:10.

The thermoplastic resin composition according to the third embodiment of the present invention is characterized by comprising the graft copolymer AES resin) as a third component. The graft copolymer (AES resin) has a backbone polymer constituted by an ethylene-propylene-diene copolymer (EPDM) or an ethylene-propylene copolymer (EPR), both of which are random copolymers in which an ethylene/propylene weight ratio is 20-85:80-15. The dienes in EPDM may be, for instance. dicyclopentadiene, ethyldiene norbornene, 1,4-hexadiene, 1,5-hexadiene, 2-methyl-1,5-hexadiene, 1,4-cycloheptadiene, 1,5-cyclooctadiene and their mixtures.

The weight-average molecular weight of EPDM or EPR is 30,000-1,000,000. When it is less than 30,000 sufficient strength cannot be provided, and when it exceeds 1,000,000, good dispersion of the graft copolymer (AES resin) cannot be achieved. The preferred weight-average molecular weight is 50,000-200,000. Incidentally, a proportion of unsaturated bonds in the EPDM is preferably 5-40 when expressed as an iodine value.

The styrene monomers which are grafted to the EPDM or the EPR include styrene, α-methylstyrene, α-chlorostyrene, dimethylstyrene, etc. and styrene is particularly preferable.

The acrylonitrile monomers which are grafted to the EPDM or the EPR include acrylonitrile, methacrylonitrile, etc.

The preferred content of the EPDM or the EPR in the AES resin is 5-60 weight %. When it is less than 5 weight %, sufficient impact strength cannot be provided, and the compatibility is low when blended. On the other hand, when it exceeds 60 weight %, the rigidity of the composition is lowered and the compatibility decreases.

The amount of styrene + acrylonitrile (styrene/acrylonitrile (AS graft moiety) is 95-40 weight %, and a weight ratio of the acrylonitrile monomer to the styrene monomer in the AS moiety is 5:95–50:50. Outside this range, sufficient compatibility cannot be provided.

The AES resin can be prepared by mixing the EPDM or EPR with predetermined amounts of a styrene monomer and an acrylonitrile monomer in the presence of a graft polymerization catalyst. The graft polymerization may be conducted by any of bulk polymerization, emulsion polymerization and solution polymerization.

Graft polymerization catalysts may be usual radical polymerization catalysts including peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate, azo compounds such as azobisisobutyronitrile, etc.

In this embodiment, the amount of the graft copolymer (AES resin) added is 5–100 parts by weight per 100 parts by weight of the crystalline polyolefin + the polycarbonate. When it is less than 5 parts by weight, the resulting thermoplastic resin composition has insufficient impact resistance and thermal deformation resistance, and when it exceeds 100 parts by weight, the rigidity decreases dramatically, making it unusable in practical applications. The preferred amount of the graft copolymer is 10–50 parts by weight, and more preferably, it is 15–40 parts by weight.

The thermoplastic resin composition according to the fourth embodiment of the present invention is characterized by comprising the graft copolymer (AES resin) and the styrene-olefin block copolymer as third and fourth components.

The graft copolymer (AES resin) may be the same as in the third embodiment as described above.

With respect to the styrene-olefin block copolymer, it is a block copolymer composed of a styrene monomer and an $\alpha$-olefin, and an $\alpha$-olefin block may be made of a single $\alpha$-olefin or two or more types of $\alpha$-olefins. The preferred block copolymers are a styrene-ethylene butylene-styrene block copolymer and a styrene-ethylene-propylene block copolymer. The styrene-ethylene-butylene-styrene block copolymer may be the same as in the second embodiment, and the styrene-ethylene-propylene block copolymer may be the same as in the first embodiment.

A total amount of the graft copolymer (AES resin) and the styrene-olefin block copolymer added is 5–100 parts by weight per 100 parts by weight of the crystalline polyolefin + the polycarbonate. When it is less than 5 parts by weight, the resulting thermoplastic resin composition has insufficient impact resistance, thermal deformation resistance and surface peel resistance, and when it exceeds 100 parts by weight, the rigidity decreases dramatically, making it unusable in practical applications. The preferred amount of the graft copolymer + the styrene-olefin block copolymer is 10–50 parts by weight, and more preferably, it is 15–40 parts by weight.

A weight ratio of the graft copolymer (AES resin) to the styrene-olefin block copolymer is 30/70–95/5. When it is less than 30/70, the rigidity and thermal deformation resistance of the resulting composition are low, and when it exceeds 95/5, the moldability decreases and the surface peel appears.

The thermoplastic resin composition of this embodiment may further contain up to 50 parts by weight of rubber components such a low-crystallinity ethylene-$\alpha$-olefin copolymer polypropylene, an acrylic elastomer, a butyl rubber, etc., per 100 parts by weight of the crystalline polyolefin + the polycarbonate.

The thermoplastic resin composition according to the fifth embodiment of the present invention is characterized by comprising the modified polyolefin and polybutylene terephthalate as third and fourth components.

The modified polyolefin is a polyolefin modified with unsaturated carboxylic acid or its anhydride.

The unsaturated carboxylic acids or anhydrides thereof include monocarboxylic acids such as acrylic acid, methacrylic acid, etc; dicarboxylic acids such as maleic acid, fumaric acid, itaconic acid, etc.: dicarboxylic anhydrides such as maleic anhydride, itaconic anhydride, etc. Particularly, dicarboxylic acid or an anhydride thereof is preferable.

The polyolefins which are modified with the unsaturated carboxylic acid or its anhydride include homopolymers of olefins such as polyethylene, polypropylene, polybutene-1, polypentene-1, etc., and copolymers of different olefins or those of olefins and diolefins, such as an ethylene-propylene copolymer, an ethylene-butene-1 copolymer, a propylene-butene-1 copolymer, an ethylene-vinyl acetate copolymer, a propylene-vinyl acetate copolymer, an ethylene-butadiene copolymer, an ethylene-isoprene copolymer, an ethylene-chloroprene copolymer, a propylene-butadiene copolymer, an ethylene-propylene-diene copolymer, etc. The copolymers may be random copolymers, block copolymers, graft copolymers or alternating copolymers.

The modified polyolefin preferably does not contain unreacted monomers and has a weight-average molecular weight of 10,000 or more. The more preferable weight-average molecular weight is 30,000–300,000.

The content of the unsaturated carboxylic acid or its anhydride in the modified polyolefin is preferably 0.1–10 weight %. When it is less than 0.1 weight %, the addition of the modified polyolefin does not sufficiently increase the compatibility of the aromatic polycarbonate and the polyolefin. On the other hand, when it exceeds 10 weight %, its compatibility with polyolefin decreases. The more preferable amount of the unsaturated carboxylic acid or its anhydride is 0.5–5 weight %.

The production of the modified polyolefin can be conducted by a solution method or a melt blending method. In the case of the melt blending method, the polyolefin, the unsaturated carboxylic acid (or anhydride) and a catalyst are charged into an extruder or a double-screw kneader (extruder) and kneaded while heating at 150–250° C. In the case of the solution method, the above starting materials are dissolved in an organic solvent such as xylene, and stirred at a temperature of 80–140° C. In any case, the catalyst may be a usual radical polymerization catalyst as in the production of the graft copolymer (AES resin) in the third embodiment. The amount of the catalyst may be 1–100 parts by weight per 100 parts by weight of the unsaturated carboxylic acid or anhydride thereof.

The polybutylene terephthalate is a polyester composed of terephthalic acid and 1,4-butylene glycol, which has an intrinsic viscosity [$\eta$] of about 0.5–2.0, which is determined from a solution viscosity measured in a phenol/tetrachloroethane mixed solvent (50/50 by weight %) at 30° C. The terephthalic acid component may be substituted by an alkyl group, a halogen group, etc., and the glycol component may contain, in addition to 1,4-butylene glycol, up to 20 weight % of other glycols such as ethylene glycol, propylene glycol, hexamethylene glycol, etc.

The amount of the modified polyolefin added is 2–100 parts by weight per 100 parts by weight of the aromatic polycarbonate + the polyolefin. When it is less than 2 parts by weight, the addition of the modified polyolefin does not have sufficient effect of improving the compatibility between the aromatic polycarbonate and the polyolefin. On the other hand, when it exceeds 100 parts by weight, the mechanical properties such as impact strength is lowered. The preferred amount of the modified polyolefin is 5–50 parts by weight.

The amount of the polybutylene terephthalate is 2–100 parts by weight per 100 parts by weight of the aromatic polycarbonate + the polyolefin. When it is less than 2 parts by weight, the addition of the polybutylene terephthalate does not have sufficient effect of improving the compatibility between the aromatic polycarbonate and the polyolefin. On the other hand, when it exceeds 100 parts by weight, the mechanical properties such as impact strength is lowered. The preferred amount of the polybutylene terephthalate is 5–50 parts by weight.

The thermoplastic resin composition of this embodiment may further contain up to 100 parts by weight of rubber components such a low-crystallinity ethylene-α-olefin copolymer, an acrylic elastomer, a butyl rubber, etc. per 100 parts by weight of the crystalline polyolefin + the polycarbonate.

The polycarbonate and the polyolefin does not have good compatibility, but the modified polyolefin is highly compatible with the polyolefin. In addition, the polycarbonate is compatible with the polybutylene terephthalate by a transesterification reaction therebetween in the process of blending. Further, a reaction takes place between the carboxylic groups of the modified polyolefin and the —OH end groups of the polybutylene terephthalate to generate a graft copolymer. These reactions contribute to the compatibility of the polycarbonate with the polyolefin. Accordingly, by blending the polycarbonate, the polyolefin, the modified polyolefin and the polybutylene terephthalate, good compatibility between the polycarbonate and the polyolefin can be achieved, thereby providing the thermoplastic resin composition with a good balance of mechanical properties, moldability, solvent resistance, etc.

The thermoplastic resin composition according to the sixth embodiment of the present invention is characterized by containing a styrene-maleic anhydride copolymer and an oxazoline ring-containing modified polyolefin as third and fourth components.

The styrene-maleic anhydride copolymer is composed of 1–20 weight % of maleic anhydride and balance substantially a styrene monomer. When maleic anhydride is less than 1 weight %, the styrene-maleic anhydride copolymer has low affinity (reactivity) for the oxazoline ring-containing modified polyolefin, and when it exceeds 20 weight %, the styrene-maleic anhydride copolymer becomes too reactive, causing the decrease in flowability due to cross-linking. The preferred amount of maleic anhydride is 3–15 weight %. With respect to the styrene monomer copolymerized with the maleic anhydride, it may be the same as in the above first through fourth embodiments.

The styrene-maleic anhydride copolymer has a weight-average molecular weight of 10,000–1,000,000. When it is less than 10,000, sufficient effect of improving the compatibility cannot be provided, and when it exceeds 1,000,000, the flowability decreases dramatically. The preferred weight-average molecular weight is 20,000–200,000.

Incidentally, in the above styrene-maleic anhydride copolymer, part of the styrene monomer (up to 50 weight %) may be replaced by a radical polymerizable monomer such as acrylonitrile, (meth)acrylate, etc.

The production of the styrene-maleic anhydride copolymer can be conducted by a solution method or a melt blending method. In the case of the melt blending, the polyolefin, the unsaturated carboxylic acid (or anhydride) and a catalyst are charged into an extruder or a double-screw kneader (extruder) and kneaded. In the case of the solution method, the above starting materials are dissolved in an organic solvent such as toluene, and stirred at a temperature of 50–120° C. In any case, the catalyst may be a usual radical polymerization catalyst as in the production of the graft copolymer (AES resin) in the third embodiment. The amount of the catalyst may be 0.01–5 parts by weight per 100 parts by weight of the starting materials.

The oxazoline ring-containing modified polyolefin is a polyolefin grafted with an oxazoline ring-containing monomer. The oxazoline ring-containing monomer has a vinyl group bonded to an oxazoline ring, a typical example of which is shown by the following formula:

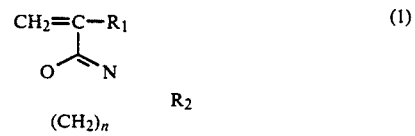

wherein $R_1$ and $R_2$ are respectively a hydrogen atom or an alkyl group and n is an integer of 2 or 3.

Specific examples of the oxazoline ring-containing monomer are 2-isopropenyl-2-oxazoline shown by the following formula (2), 2-isopropenyl-4,4-dimethyl-2-oxazoline shown by the following formula (3), and other vinyl oxazolines.

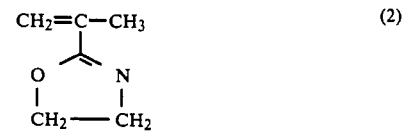

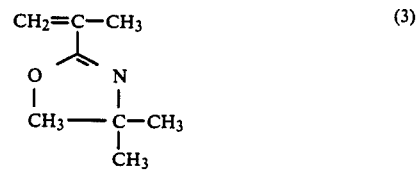

The polyolefins grafted with the oxazoline ring-containing monomer may be the same as those of the modified polyolefin in the fifth embodiment. The amount of the oxazoline ring-containing monomer grafted to the polyolefin is 0.1–10 weight %. When it is less than 0.1 weight %, its affinity for the polyolefin is insufficient and its graft reaction with the styrene-maleic anhydride copolymer is low, so that it does not contribute to the improvement of the compatibility between the aromatic polycarbonate and the polyolefin. On the other hand, when it exceeds 10 weight %, its compatibility with the polyolefin is lowered. The preferred amount of the oxazoline ring-containing monomer grafted is 0.2–2 weight %.

The grafting of the oxazoline ring-containing monomer to the polyolefin can be conducted in a solution or in a molten state like the styrene-maleic anhydride copolymer. In the case of a solution method, an organic solvent such as xylene is used and the graft reaction is conducted while heating at a temperature of 80-140° C. In the case of a melt blending method, the starting materials charged into an extruder or a double-screw extruder are kneaded in a molten state at 150-250° C. In any case, the radical polymerization catalyst as described above can be used.

The amount of the styrene-maleic anhydride copolymer added is 2-100 parts by weight per 100 parts by weight of the aromatic polycarbonate + the polyolefin. When it is less than 2 parts by weight, the addition of the styrene-maleic anhydride copolymer does not have sufficient effect of improving the compatibility between the aromatic polycarbonate and the polyolefin. On the other hand, when it exceeds 100 weight %, the mechanical properties such as impact strength is lowered. The preferred amount of the styrene-maleic anhydride copolymer is 5-20 parts by weight.

The amount of the oxazoline ring-containing modified polyolefin added is 2-20 parts by weight per 100 parts by weight of the aromatic polycarbonate + the polyolefin. When it is less than 2 parts by weight, the addition of the oxazoline ring-containing modified polyolefin does not have sufficient effect of improving the compatibility between the aromatic polycarbonate and the polyolefin. On the other hand, when it exceeds 20 parts by weight, the mechanical properties such as impact strength is lowered. The preferred amount of the oxazoline ring-containing modified polyolefin is 5-15 parts by weight.

The thermoplastic resin composition of this embodiment may further contain up to 100 parts by weight of rubber components such a low-crystallinity ethylene-α-olefin copolymer polypropylene, an acrylic elastomer, a butyl rubber, etc., per 100 parts by weight of the crystalline polyolefin + the polycarbonate.

The styrene-maleic anhydride copolymer has a high affinity for the aromatic polycarbonate and a reaction takes place between the carboxylic groups of the styrene-maleic anhydride copolymer and the oxazoline groups of the oxazoline ring-containing modified polyolefin to generate a graft copolymer. These reactions contribute to the compatibility of the polycarbonate with the polyolefin. Accordingly, by blending the polycarbonate, the polyolefin. The oxazoline ring-containing modified polyolefin and the styrene-maleic anhydride copolymer, good compatibility between the polycarbonate and the polyolefin can be achieved, thereby providing the thermoplastic resin composition with a good balance of mechanical properties, moldability, solvent resistance, etc.

The thermoplastic resin composition according to the seventh embodiment of the present invention is characterized by containing the modified polyolefin and the oxazoline ring-containing styrene copolymer as third and fourth components.

The modified polyolefin in this embodiment may be the same as in the fifth embodiment.

The oxazoline ring-containing styrene copolymer is based on an oxazoline ring-containing monomer and a styrene monomer. The oxazoline ring-containing monomer may be the same as in the sixth embodiment. With respect to the styrene monomer, it may be the same as in the above first through fourth and sixth embodiments.

The amount of the oxazoline ring-containing monomer is 0.1-10 weight %. When maleic anhydride is less than 0.1 weight %, the oxazoline ring to be cross-linked with the modified polyolefin is insufficient, failing to contribute to the improvement of the compatibility between the polycarbonate and the polyolefin. On the other hand, when it exceeds 10 weight %, the oxazoline ring-containing monomer becomes too reactive, causing the decrease in flowability due to cross-linking. The preferred amount of oxazoline ring-containing monomer is 0.2-3 weight %.

Besides the oxazoline ring-containing monomer and the styrene monomer, the oxazoline ring-containing styrene copolymer may contain radical-polymerizable monomers. Such radical-polymerizable monomers include acrylonitrile, (meth)acrylates, etc. The amount of the radical-polymerizable monomers is up to 50 weight %, substituting for the styrene monomer.

The oxazoline ring-containing styrene copolymer can be produced from the above starting materials in the presence of a radical polymerization catalyst. When the copolymerization reaction is conducted in a solution, toluene, etc. is used as a solvent and the solution is heated at 40-120° C. while stirring.

The content of the modified polyolefin is 2-30 parts by weight per 100 parts by weight of the aromatic polycarbonate + the polyolefin. When it is less than 2 parts by weight, sufficient effect of improving the compatibility between the aromatic polycarbonate and the polyolefin cannot be provided by the addition of the modified polyolefin. On the other hand, when it exceeds 30 parts by weight, the resulting composition has low mechanical properties such as impact resistance. The preferred amount of the modified polyolefin is 5-15 parts by weight in this embodiment.

The content of the oxazoline ring-containing styrene copolymer is 2-30 parts by weight per 100 parts by weight of the aromatic polycarbonate + the polyolefin. When it is less than 2 parts by weight, sufficient effect of improving the compatibility between the aromatic polycarbonate and the polyolefin cannot be provided by the addition of the oxazoline ring-containing styrene copolymer. On the other hand, when it exceeds 30 parts by weight, the resulting composition has low mechanical properties such as impact resistance. The preferred amount of the oxazoline ring-containing styrene copolymer is 5-15 parts by weight in this embodiment.

The thermoplastic resin composition of this embodiment may further contain up to 100 parts by weight of rubber components such a low-crystallinity ethylene-α-olefin copolymer, an acrylic elastomer, a butyl rubber, etc., per 100 parts by weight of the crystalline polyolefin + the polycarbonate.

The oxazoline ring-containing styrene copolymer has a high affinity for the aromatic polycarbonate, and a reaction takes place between the carboxylic groups of the modified polyolefin and the oxazoline groups of the oxazoline ring-containing styrene copolymer to generate a graft copolymer. These reactions contribute to the compatibility of the polycarbonate with the polyolefin. Accordingly, by blending the polycarbonate, the polyolefin, the modified polyolefin and the oxazoline ring-containing styrene copolymer, good compatibility between the polycarbonate and the polyolefin can be achieved, thereby providing the thermoplastic resin composition with a good balance of mechanical properties, moldability, solvent resistance, etc.

The thermoplastic resin composition according to the eighth embodiment of the present invention is characterized by containing the modified polyolefin and the saponified olefin-vinyl ester copolymer as third and fourth components.

The modified polyolefin in this embodiment may be the same as in the fifth embodiment.

The saponified olefin-vinyl ester copolymer is composed of a lower α-olefin and vinyl ester. The preferred lower α-olefin is ethylene.

The vinyl ester copolymerized with the lower α-olefin is a vinyl ester monomer shown by the following general formula:

$$CH_2=CHOCOR_3 \ldots \quad (4)$$

wherein $R_3$ is an alkyl group having 1-about 10 carbon atoms or an aryl group having 6-about 12 carbon atoms.

Specific examples of the vinyl esters are vinyl formate, vinyl acetate, vinyl propionate, vinyl butyrate, vinyl benzoate, etc., and particularly preferable among them is vinyl acetate.

The content of the vinyl ester in the above saponified olefin-vinyl ester copolymer is 10-70 weight %. When it is less than 10 weight %, or when it exceeds 70 weight %, sufficient effect of improving the compatibility between the aromatic polycarbonate and the polyolefin cannot be provided. The preferred amount of the vinyl ester is 25-60 weight %.

The saponification degree of the saponified olefin-vinyl ester copolymer is 50% or more. When it is less than 50%, the saponified olefin-vinyl ester copolymer has an insufficient amount of hydroxy groups to be bonded to the carboxylic groups of the modified polyolefin, failing to provide sufficient effect of improving the compatibility between the aromatic polycarbonate and the polyolefin. The preferred saponification degree is 70% or more. Incidentally, the saponification of the copolymer can be conducted by a usual method, for instance, by heating a copolymer's aqueous solution at 50-90° C., if necessary, in the presence of alkali such as sodium hydroxide.

The content of the modified polyolefin is 2-30 parts by weight per 100 parts by weight of the aromatic polycarbonate + the polyolefin. When it is less than 2 parts by weight, sufficient effect of improving the compatibility between the aromatic polycarbonate and the polyolefin cannot be provided by the addition of the modified polyolefin. On the other hand, when it exceeds 30 parts by weight, the resulting composition has low mechanical properties such as impact resistance. The preferred amount of the modified polyolefin is 5-20 parts by weight in this embodiment.

The content of the saponified olefin-vinyl ester copolymer is 2-100 parts by weight per 100 parts by weight of the aromatic polycarbonate + the polyolefin. When it is less than 2 parts by weight, sufficient effect of improving the compatibility between the aromatic polycarbonate and the polyolefin cannot be provided by the addition of the saponified olefin-vinyl ester copolymer. On the other hand, when it exceeds 100 parts by weight, the resulting composition has low rigidity. The preferred amount of the saponified olefin-vinyl ester copolymer is 5-50 parts by weight in this embodiment.

The thermoplastic resin composition of this embodiment may further contain up to 100 parts by weight of rubber components such a low-crystallinity ethylene-α-olefin copolymer, an acrylic elastomer, a butyl rubber, etc., per 100 parts by weight of the crystalline polyolefin + the polycarbonate.

The saponified olefin-vinyl ester copolymer has a high affinity for the aromatic polycarbonate, and a reaction or hydrogen bonding takes place between the carboxylic groups of the modified polyolefin and the —OH end groups of the saponified olefin-vinyl ester copolymer. These reactions contribute to the compatibility of the polycarbonate with the polyolefin. Accordingly, by blending the polycarbonate, the polyolefin, the modified polyolefin and the saponified olefin-vinyl ester copolymer, good compatibility between the polycarbonate and the polyolefin can be achieved, thereby providing the thermoplastic resin composition with a good balance of mechanical properties, moldability, solvent resistance. etc.

The thermoplastic resin composition according to the ninth embodiment of the present invention is characterized by containing the modified polyolefin and the epoxy group-containing styrene copolymer as third and fourth components.

The modified polyolefin in this embodiment may be the same as in the fifth embodiment.

The epoxy group-containing styrene copolymer is a copolymer composed of an unsaturated epoxy compound and a styrene monomer.

The unsaturated epoxy compound is a compound having an epoxy group and a polymerizable unsaturated group in its molecule, including unsaturated glycidyl esters, unsaturated glycidyl ethers, epoxy alkanes, p-glycidyl styrenes, etc. Specific examples thereof are glycidyl acrylate, glycidyl methacrylate, glycidyl itaconate allyl glycidyl ether, 2-methyl allyl glycidyl ether, styrene-p-glycidyl ether. 3,4-epoxy butene, 3,4-epoxy-3-methyl-1-butene, 3,4-epoxy-1-pentene, 3,4-epoxy-3-methylpentene, 5,6-epoxy-1-hexene, vinyl cyclohexene monoxide, p-glycidyl styrene, etc.

The styrene monomer may be styrene, α-methylstyrene, vinyl toluene, 2,4-dimethylstyrene, chlorostyrene, p-methylstyrene, etc.

Other monomers copolymerizable with the unsaturated epoxy compound and the styrene monomer include acrylonitrile monomers such as acrylonitrile, methacrylonitrile, etc.; acrylate monomers such as methyl acrylate, 2-ethylhexyl acrylate, methoxyethyl acrylate, butoxyethyl acrylate, butyl acrylate, methoxybutyl acrylate, phenyl acrylate, methyl methacrylate, ethyl methacrylate, propyl methacrylate, methoxyethyl methacrylate, ethoxyethyl methacrylate, phenyl methacrylate, lauryl methacrylate, etc.

The epoxy group-containing monomer in the epoxy group-containing styrene copolymer is 1-50 mol %. When it is less than 1 mol %, it does not have sufficient reactivity with the modified polyolefin, and when it exceeds 50 mol %, it loses compatibility with the polycarbonate. The preferred content of the epoxy group-containing monomer is 3-20 mol %.

The amount of the styrene monomer is 50-94 mol % in the epoxy group-containing styrene copolymer. When it is less than 50 mol%, it does not have good compatibility with the polycarbonate. When it exceeds 94 mol %, it does not have sufficient reactivity with the modified polyolefin.

The epoxy group-containing styrene copolymer may further contain acrylonitrile, etc. When acrylonitrile, etc. is contained, its content is 5-20 mol %. Acrylonitrile, etc. serves to increase the affinity of the epoxy group-containing styrene copolymer for the polycarbonate.

The epoxy group-containing styrene copolymer has a number-average molecular weight of 2,000 or more. When it is less than 2,000, the copolymer's mechanical strength is low. The preferred number-average molecular weight is 3,000–200,000.

The content of the modified polyolefin is 2–30 parts by weight per 100 parts by weight of the aromatic polycarbonate + the polyolefin. When it is less than 2 parts by weight, sufficient effect of improving the compatibility between the aromatic polycarbonate and the polyolefin cannot be provided by the addition of the modified polyolefin. On the other hand, when it exceeds 30 parts by weight, the resulting composition has low mechanical properties such as rigidity and impact resistance. The preferred amount of the modified polyolefin is 5–20 parts by weight in this embodiment.

The content of the epoxy group-containing styrene copolymer is 2–30 parts by weight per 100 parts by weight of the aromatic polycarbonate + the polyolefin. When it is less than 2 parts by weight, sufficient effect of improving the compatibility between the aromatic polycarbonate and the polyolefin cannot be provided by the addition of the epoxy group-containing styrene copolymer. On the other hand, when it exceeds 30 parts by weight, the resulting composition has low mechanical properties such as rigidity and impact resistance. The preferred amount of the epoxy group-containing styrene copolymer is 5–20 parts by weight in this embodiment.

The thermoplastic resin composition of this embodiment may further contain up to 100 parts by weight of rubber components such a low-crystallinity ethylene-α-olefin copolymer, an acrylic elastomer, a butyl rubber, etc., per 100 parts by weight of the crystalline polyolefin + the polycarbonate.

The epoxy group-containing styrene copolymer has a good affinity for the polycarbonate, and a reaction takes place between the carboxylic groups of the modified polyolefin and the epoxy groups of the epoxy group-containing styrene copolymer to generate a graft copolymer. These reactions contribute to the compatibility of the polycarbonate with the polyolefin. Accordingly, by blending the polycarbonate, the polyolefin, the modified polyolefin and the epoxy group-containing styrene copolymer, good compatibility between the polycarbonate and the polyolefin can be achieved, thereby providing the thermoplastic resin composition with a good balance of mechanical properties, moldability, solvent resistance, etc.

The present invention will be explained in further detail referring to the following Examples.

The measurement of the properties of the thermoplastic resin compositions were conducted in each Example and Comparative Example as follows:

(1) Flexural modulus Measured according to ASTM D790.

(2) Izod impact strength Measured according to ASTM D256 at 23° C. and −30° C., respectively.

(3) Dynamic melt viscosity Measured by a dynamic spectrometer of Rheometrix at 250° C. and 100 rad/sec.

(4) Surface peel resistance

The surface of each sample was cut by a razor in a checkered pattern to have 100 checkers of 1 mm×1 mm. An adhesive cellophane tape (manufactured by Nichiban Co., Ltd.) was adhered onto the sample surface and then peeled off. The number of remaining checkers was counted.

(5) Weight change by methanol immersion Each sample was immersed in methanol at 25° C. for 30 days and the change in its weight was measured.

(6) Tensile elongation at break Measured according to ASTM D 638.

(7) Heat deflection temperature Measured according to ASTM D648 and shown by a temperature at which a test piece (cantilever) was distorted by a predetermined amount (0.254 mm) under a constant load (4.6 kg/cm$^2$) when the temperature was elevated at a constant rate of 2° C./min.

(8) Thermal deformation temperature Measured according to JIS K7207, and shown by a temperature at which a test piece (cantilever) was deformed by a predetermined amount (0.25 mm) under a constant load (4.6 kg/cm$^2$) when the temperature was elevated at a constant rate of 2° C./min.

EXAMPLE 1

Crystalline polypropylene (MFR =9.0 g/10 min), a polycarbonate resin (Panlite L 1225 manufactured by Teijin Chemicals, Ltd.) and a styrene-ethylene-propylene block copolymer (Kraton G 1701 manufactured by Shell Kagaku K.K., a styrene/rubber weight ratio =37/63) were mixed in the proportions shown in Table 1 at room temperature in a Henschel mixer. The resulting mixture was kneaded at 250° C. in a double-screw extruder to provide composition pellets.

The resulting thermoplastic resin composition was measured with respect to flexural modulus, Izod impact strength, dynamic melt viscosity, surface peel resistance and solvent resistance (weight change by methanol immersion). The results are shown in Table 1.

EXAMPLES 2–5 and 8

Example 1 was repeated except for changing the proportions of the crystalline polypropylene, the polycarbonate and the styrene-ethylene-propylene block copolymer as shown in Table 1. and the properties of the resulting thermoplastic resin compositions were measured. The results are shown in Table 1.

EXAMPLE 6

Example 2 was repeated except for replacing 10 parts by weight of the polypropylene by an ethylene-propylene rubber (Tafmer P 0180 manufactured by Mitsui Petrochemical Industries, Ltd.), and the properties of the resulting thermoplastic resin composition were measured. The results are shown in Table 1.

EXAMPLE 7

Example 2 was repeated except for using as the crystalline polypropylene a propylene block copolymer (BJ 309 manufactured by Tonen Sekiyu Kagaku K.K., propylene =92.7 weight %, ethylene 7.3 weight %, MFR =9 g/10 min), and the properties of the resulting thermoplastic resin composition were measured. The results are shown in Table 1.

TABLE 1

| Example No. | Composition (Weight %) | | | | Properties | | | | | |
|---|---|---|---|---|---|---|---|---|---|---|
| | PP[1] | PC[2] | SEP[3] | Other | Flexural Modulus (kgf/cm²) | Izod Impact Strength (kgf/cm²) at 23° C. | at −30° C. | Dynamic Melt Viscosity (×10³ poise) | Surface Peel Resistance | Solvent Resistance[4] |
| 1 | 70 | 20 | 10 | — | 11500 | 8.9 | 6.4 | 2.4 | 100 | 0.27 |
| 2 | 50 | 30 | 20 | — | 8600 | 21.0 | 8.8 | 2.8 | 100 | 0.36 |
| 3 | 40 | 40 | 20 | — | 9200 | 35.8 | 19.9 | 3.1 | 100 | 0.38 |
| 4 | 30 | 50 | 20 | — | 9500 | 46.3 | 25.4 | 3.4 | 100 | 0.46 |
| 5 | 20 | 70 | 10 | — | 15800 | 59.6 | 32.0 | 7.0 | 100 | 0.74 |
| 6 | 40 | 30 | 20 | 10[5] | 7700 | 21.1 | 8.5 | 2.5 | 100 | 0.37 |
| 7 | 50[6] | 30 | 20 | — | 7900 | 24.6 | 10.3 | 2.7 | 100 | 0.36 |
| 8 | 20 | 40 | 40 | — | 6800 | 48.5 | 28.6 | 3.9 | 100 | 0.40 |

Note:
[1] Polypropylene
[2] Polycarbonate
[3] Styrene-ethylene · propylene block copolymer
[4] Weight change by methanol immersion (weight %)
[5] Ethylene-propylene rubber (Tafmer P 0180 manufactured by Mitsui Petrochemical Industries, Ltd.)
[6] Propylene block copolymer (BJ 309 manufactured by Tonen Sekiyu Kagaku K.K., MFR = 9 g/10 min)

COMPARATIVE EXAMPLES 1, 2

Thermoplastic resin compositions were prepared in the same manner as in Example 1 except for using a two-component system consisting of the crystalline polypropylene and the polycarbonate, and their properties were measured. The results are shown in Table 2.

COMPARATIVE EXAMPLE 3

Example 2 was repeated except for replacing the styrene-ethylene-propylene block copolymer by a styrene-ethylene-butylene-styrene block copolymer (Kraton G 1650 manufactured by Shell Kagaku K.K.), and the properties of the resulting thermoplastic resin composition were measured. The results are shown in Table 2.

COMPARATIVE EXAMPLE 4

Example 2 was repeated except for replacing the styrene-ethylene-propylene block copolymer by an ethylene-vinyl acetate copolymer (NUC DQ DJ 3269 manufactured by Nippon Unicar Co., Ltd.), and the properties of the resulting thermoplastic resin composition were measured. The results are shown in Table 2.

COMPARATIVE EXAMPLE 5

Example 2 was repeated except for replacing the styrene-ethylene-propylene block copolymer by an ethylene-ethyl acrylate copolymer (NUC 6570 manufactured by Nippon Unicar Co., Ltd.), and the properties of the resulting thermoplastic resin composition were measured. The results are shown in Table 2.

COMPARATIVE EXAMPLE 6

In the case of 100 weight % polycarbonate, the resin's properties were similarly measured. The results are shown in Table 2.

COMPARATIVE EXAMPLE 7

A thermoplastic resin composition was prepared in the same manner as in Example 2 except for reducing the amount of the styrene-ethylene-propylene block copolymer to 3 weight %, and its properties were measured. The results are shown in Table 2.

COMPARATIVE EXAMPLE 8

A thermoplastic resin composition was prepared in the same manner as in Example 2 except for increasing the amount of the styrene-ethylene-propylene block copolymer to 60 weight % (150 parts by weight per 100 parts by weight of polypropylene+polycarbonate), and its properties were measured. The results are shown in Table 2.

TABLE 2

| Comparative Example No. | Composition (Weight %) | | | | Properties | | | | | |
|---|---|---|---|---|---|---|---|---|---|---|
| | PP[1] | PC[2] | SEP[3] | Other | Flexural Modulus (kgf/cm²) | Izod Impact Strength (kgf/cm²) at 23° C. | at −30° C. | Dynamic Melt Viscosity (×10³ poise) | Surface Peel Resistance | Solvent Resistance[4] |
| 1 | 70 | 30 | — | — | 15400 | 3.1 | 3.6 | 3.1 | 0 | 0.27 |
| 2 | 50 | 50 | — | — | 15900 | 3.9 | 4.1 | 8.1 | 0 | 0.48 |
| 3 | 50 | 30 | — | 20[5] | 9800 | 8.0 | 3.4 | 3.9 | 85 | 0.37 |
| 4 | 50 | 30 | — | 20[6] | 10200 | 5.8 | 2.6 | 3.2 | 0 | 0.38 |
| 5 | 50 | 30 | — | 20[7] | 8600 | 4.5 | 2.3 | 3.2 | 60 | 0.40 |
| 6 | — | 100 | — | — | 19500 | 62.5 | 12.5 | 18 | 100 | 1.60 |
| 7 | 67 | 30 | 3 | — | 13800 | 5.2 | 3.4 | 2.8 | 18 | 0.37 |
| 8 | 20 | 20 | 60 | — | 2800 | 64.0 | 39.5 | 5.6 | 100 | 1.02 |

Note:
[1] Polypropylene
[2] Polycarbonate
[3] Styrene-ethylene · propylene block copolymer
[4] Weight change by methanol immersion (weight %)
[5] Styrene-ethylene · butylene-styrene block copolymer (Kraton G 1650 manufactured by Shell Kagaku K.K.)
[6] Ethylene-vinyl acetate copolymer (NUC PQ DJ 3269 manufactured by Nippon Unicar Co., Ltd.)
[7] Ethylene-ethyl acrylate copolymer (NUC 6570 manufactured by Nippon Unicar Co., Ltd.)

It is clear from Tables 1 and 2 that the thermoplastic resin compositions of the present invention have much better flexural modulus, impact strength, moldability (shown by dynamic melt viscosity), surface peel resistance and solvent resistance than those outside the scope of the present invention (Comparative Examples).

EXAMPLES 9-15

Crystalline polypropylene (MFR=9.0 g/10 min), a polycarbonate resin (Panlite L 1225 manufactured by Teijin Chemicals, Ltd.), a styrene-ethylene-butylene-styrene block copolymer (Kraton G 1650 manufactured by Shell Kagaku K.K., a styrene/rubber weight ratio=28/72) and an ethylene-propylene rubber (Tafmer P0180 manufactured by Mitsui Petrochemical Industries, Ltd.) were mixed in the proportions shown in Table 3 at room temperature in a Henschel mixer. Each of the resulting mixtures was then kneaded at 250° C. in a double-screw extruder to provide composition pellets.

The resulting thermoplastic resin compositions were measured with respect to flexural modulus, Izod impact strength, tensile elongation at break, dynamic melt viscosity, surface peel resistance and solvent resistance (weight change by methanol immersion). The results are shown in Table 3.

EXAMPLE 16

Example 11 was repeated except for replacing the ethylene-propylene rubber by 10 parts by weight of an ethylene-butene-1 copolymer (Tafmer A 4085 manufactured by Mitsui Petrochemical Industries, Ltd.), and the properties of the resulting thermoplastic resin composition were measured. The results are shown in Table 3.

EXAMPLE 17

Example 11 was repeated except for using as the crystalline polypropylene a propylene block copolymer (BJ 309 manufactured by Tonen Sekiyu Kagaku K.K., propylene=92.7 weight %, ethylene=7.3 weight %, MFR=9 g/10 min), and the properties of the resulting thermoplastic resin composition were measured. The results are shown in Table 3.

EXAMPLE 18

Example 11 was repeated except for using as the styrene-ethylene-butylene-styrene copolymer Kraton G 1657 (manufactured by Shell Kagaku K.K., a styrene/rubber weight ratio=14/86), and the properties of the resulting thermoplastic resin composition were measured. The results are shown in Table 3.

COMPARATIVE EXAMPLES 9, 10

Thermoplastic resin compositions were prepared in the same manner as in Example 9 except for using a two-component system consisting of the crystalline polypropylene and the polycarbonate, and their properties were measured. The results are shown in Table 4.

COMPARATIVE EXAMPLE 11

Crystalline polypropylene (MFR =9.0 g/10 min), a polycarbonate resin (Panlite L 1225 manufactured by Teijin Chemicals, Ltd.) and an ethylene-propylene rubber (Tafmer P 0180 manufactured by Mitsui Petrochemical Industries, Ltd.) were mixed in the proportions shown in Table 4 at room temperature in a Henschel mixer. The resulting mixtures was then kneaded at 250° C. in a double-screw extruder to provide composition pellets.

The properties of the resulting thermoplastic resin composition was measured in the same manner as in Example 9. The results are shown in Table 4.

COMPARATIVE EXAMPLE 12

Comparative Example 11 was repeated except for replacing the ethylene-propylene rubber by a styrene-ethylene-butylene-styrene block copolymer (Kraton G 1650 manufactured by Shell Kagaku K.K.), and the properties of the resulting thermoplastic resin composition were measured. The results are shown in Table 4.

COMPARATIVE EXAMPLE 13

Example 11 was repeated except for replacing the ethylene-propylene rubber by an ethylene-vinyl acetate copolymer (NUC DQ DJ 3269 manufactured by Nippon Unicar Co., Ltd.), and the properties of the resulting thermoplastic resin composition were measured. The results are shown in Table 4.

COMPARATIVE EXAMPLE 14

Example 11 was repeated except for replacing the ethylene-propylene rubber by an ethylene-ethyl acrylate copolymer (NUC 6570 manufactured by Nippon Unicar Co., Ltd.). and the properties of the resulting

TABLE 3

| Example No. | Composition (Weight %) | | | | | Flexural Modulus (kgf/cm$^2$) | Izod Impact Strength (kgf/cm$^2$) | | Tensile Elongation at Break (%) | Dynamic Melt Viscosity ($\times 10^3$ poise) | Surface Peel Resistance | Solvent Resistance[5] |
|---|---|---|---|---|---|---|---|---|---|---|---|---|
| | PP[1] | SEBS[2] | PC[3] | EPR[4] | Other | | at 23° C. | at −30° C. | | | | |
| 9 | 70 | 5 | 20 | 5 | — | 11000 | 15.0 | 8.0 | 110 | 2.8 | 100 | 0.20 |
| 10 | 50 | 20 | 20 | 10 | — | 8400 | 28.0 | 8.0 | 98 | 3.0 | 100 | 0.23 |
| 11 | 40 | 20 | 30 | 10 | — | 8900 | 40.6 | 8.2 | 108 | 3.2 | 100 | 0.28 |
| 12 | 30 | 20 | 40 | 10 | — | 9800 | 52.3 | 15.4 | 140 | 3.3 | 100 | 0.42 |
| 13 | 20 | 20 | 50 | 10 | — | 10000 | 59.4 | 18.5 | 142 | 3.5 | 100 | 0.45 |
| 14 | 20 | 5 | 70 | 5 | — | 13400 | 84.3 | 34.0 | 136 | 7.0 | 100 | 0.68 |
| 15 | 20 | 30 | 30 | 20 | — | 6200 | 62.3 | 24.6 | 116 | 3.8 | 100 | 0.36 |
| 16 | 40 | 20 | 30 | — | 10[6] | 9200 | 45.2 | 13.6 | 137 | 3.2 | 100 | 0.26 |
| 17 | 40[7] | 20 | 30 | 10 | — | 8200 | 45.3 | 10.6 | 114 | 3.1 | 100 | 0.28 |
| 18 | 40 | 20[8] | 30 | 10 | — | 8300 | 42.3 | 9.6 | 126 | 3.0 | 100 | 0.29 |

Note:
[1]Polypropylene
[2]Styrene-ethylene · butylene-stylene block copolymer
[3]Polycarbonate
[4]Ethylene-propylene rubber
[5]Weight change by methanol immersion (weight %)
[6]Ethylene · butene-1 copolymer (Tafmer A 4085 manufactured by Mitsui Petrochemical Industries, Ltd.)
[7]Propylene block copolymer (BJ 309 manufactured by Tonen Sekiyu Kagaku K.K., MFR = 9 g/10 min)
[8]Kraton G 1657 (manufactured by Shell Kagaku K.K., styrene/rubber weight ratio = 14/86)

thermoplastic resin composition were measured. The results are shown in Table 4.

COMPARATIVE EXAMPLE 15

In the case of 100 weight % polycarbonate, the resin's properties were similarly measured. The results are shown in Table 4.

COMPARATIVE EXAMPLE 16

A thermoplastic resin composition was prepared in the same manner as in Example 9 except for increasing the total amount of the styrene-ethylene-butylene-styrene block copolymer and the ethylene-propylene rubber to 60 weight % (150 parts by weight per 100 parts by weight of the polypropylene + the polycarbonate), and its properties were measured. The results are shown in Table 4.

was kneaded at 250° C. in a double-screw extruder to provide composition pellets.

The resulting thermoplastic resin composition was measured with respect to flexural modulus, Izod impact strength, heat deflection temperature, dynamic melt viscosity and solvent resistance (weight change by methanol immersion). The results are shown in Table 5.

EXAMPLES 20–23, 25

Example 19 was repeated except for changing the proportions of the crystalline polypropylene, the polycarbonate and the graft copolymer (AES resin) as shown in Table 5, and the properties of the resulting thermoplastic resin compositions were measured. The results are shown in Table 5.

EXAMPLE 24

TABLE 4

| Comparative Example No. | Composition (Weight %) | | | | | Properties | | | | | |
|---|---|---|---|---|---|---|---|---|---|---|---|
| | | | | | | Flexural Modulus (kgf/cm$^2$) | Izod Impact Strength (kgf/cm$^2$) | | Tensile Elongation at Break (%) | Dynamic Melt Viscosity ($\times 10^3$ poise) | Surface Peel Resistance | Solvent Resistance[5] |
| | PP[1] | SEBS[2] | PC[3] | EPR[4] | Other | | at 23° C. | at −30° C. | | | | |
| 9 | 50 | — | 50 | — | — | 15900 | 3.9 | 4.1 | 6 | 8.1 | 0 | 0.48 |
| 10 | 70 | — | 30 | — | — | 15400 | 3.1 | 3.6 | 11 | 3.1 | 0 | 0.27 |
| 11 | 50 | — | 30 | 20 | — | 9200 | 5.3 | 3.2 | 21 | 3.2 | 0 | 0.30 |
| 12 | 50 | 20 | 30 | — | — | 9800 | 8.0 | 3.4 | 131 | 3.2 | 85 | 0.37 |
| 13 | 40 | 20 | 30 | — | 10[6] | 7200 | 15.0 | 5.1 | 15 | 3.5 | 45 | 0.30 |
| 14 | 40 | 20 | 30 | — | 10[7] | 7300 | 12.3 | 4.7 | 18 | 3.5 | 56 | 0.30 |
| 15 | — | — | 100 | — | — | 19500 | 62.5 | 12.5 | 102 | 18 | 100 | 1.60 |
| 16 | 20 | 40 | 20 | 20 | — | 2400 | 58.0 | 29.6 | 52 | 5.2 | 100 | 0.35 |

Note:
[1] Polypropylene
[2] Styrene-ethylene · butylene-stylene block copolymer
[3] Polycarbonate
[4] Ethylene-propylene rubber
[5] Weight change by methanol immersion (weight %)
[6] Ethylene-vinyl acetate copolymer (NUC PQ DJ 3269 manufactured by Nippon Unicar Co., Ltd.)
[7] Ethylene-ethyl acrylate copolymer (NUC 6570 manufactured by Nippon Unicar Co., Ltd.)

It is clear from Tables 3 and 4 that the thermoplastic resin compositions of the present invention have much better flexural modulus, impact strength, tensile elongation, moldability (shown by dynamic melt viscosity), surface peel resistance and solvent resistance than those outside the scope of the present invention (Comparative Examples).

EXAMPLE 19

Crystalline polypropylene (MFR =9.0 g/10 min), a polycarbonate resin (Panlite L 1225 manufactured by Teijin Chemicals, Ltd.) and an AES resin (JSR AES 110 manufactured by Japan Synthetic Rubber Co., Ltd.) were mixed in the proportions shown in Table 5 at room temperature in a Henschel mixer. The resulting mixture Example 20 was repeated except for replacing 10 weight % of the crystalline polypropylene by 10 weight % of an ethylene-propylene rubber (Tafmer P 0180 manufactured by Mitsui Petrochemical Industries, Ltd.) and the properties of the resulting thermoplastic resin composition were measured. The results are shown in Table 5.

EXAMPLE 26

Example 20 was repeated except for using as the crystalline polypropylene a propylene block copolymer (BJ 309 manufactured by Tonen Sekiyu Kagaku K.K., propylene =92.7 weight %, ethylene 7.3 weight %, MFR =9 g/10 min), and the properties of the resulting thermoplastic resin composition were measured. The results are shown in Table 5.

TABLE 5

| Example No. | Composition (Weight %) | | | | Properties | | | | | |
|---|---|---|---|---|---|---|---|---|---|---|
| | | | | | Flexural Modulus (kgf/cm$^2$) | Izod Impact Strength (kgf/cm$^2$) | | Heat Deflection Temperature (°C.) | Dynamic Melt Viscosity (10$^3$ poise) | Solvent Resistance[4] |
| | PP[1] | AES[2] | PC[3] | Other | | at 23° C. | at −30° C. | | | |
| 19 | 70 | 10 | 20 | — | 15700 | 8.0 | 6.1 | 122.1 | 3.0 | 0.25 |
| 20 | 50 | 20 | 30 | — | 15600 | 13.2 | 8.2 | 119.0 | 3.2 | 0.35 |
| 21 | 40 | 20 | 40 | — | 16700 | 20.2 | 12.0 | 122.3 | 3.5 | 0.36 |
| 22 | 30 | 20 | 50 | — | 17500 | 28.9 | 17.3 | 135.5 | 3.7 | 0.45 |
| 23 | 20 | 10 | 70 | — | 18200 | 30.2 | 19.0 | 141.8 | 7.2 | 0.75 |
| 24 | 40 | 20 | 30 | 10[5] | 12700 | 12.6 | 8.0 | 118.0 | 2.7 | 0.39 |
| 25 | 20 | 50 | 30 | — | 14900 | 17.6 | 10.1 | 132.0 | 4.0 | 0.36 |

TABLE 5-continued

| Example No. | Composition (Weight %) | | | | Properties | | | | | |
|---|---|---|---|---|---|---|---|---|---|---|
| | PP[1] | AES[2] | PC[3] | Other | Flexural Modulus (kgf/cm$^2$) | Izod Impact Strength (kgf/cm$^2$) | | Heat Deflection Temperature (°C.) | Dynamic Melt Viscosity (10$^3$ poise) | Solvent Resistance[4] |
| | | | | | | at 23° C. | at −30° C. | | | |
| 26 | 50[6] | 20 | 30 | — | 14800 | 15.8 | 10.2 | 107.6 | 3.4 | 0.36 |

Note:
[1]Polypropylene
[2]Graft copolymer produced by grafting styrene and acrylonitrile to ethylene-propylene-diene copolymer (JSR AES 110 manufactured by Japan Synthetic Rubber Co., Ltd.)
[3]Polycarbonate
[4]Weight change by methanol immersion (weight %)
[5]Ethylene-propylene rubber (Tafmer P 0180 manufactured by Mitsui Petrochemical Industries, Ltd.)
[6]Propylene block copolymer (BJ 309 manufactured by Tonen Sekiyu Kagaku K.K., MFR = 9 g/10 min)

COMPARATIVE EXAMPLES 17, 18

Thermoplastic resin compositions were prepared in the same manner as in Example 19 except for using a two-component system consisting of the crystalline polypropylene and the polycarbonate, and their properties were measured. The results are shown in Table 6.

COMPARATIVE EXAMPLE 19

Example 20 was repeated except for replacing the AES resin by an acrylonitrile-butadiene-styrene resin (ABS resin), and the properties of the resulting thermoplastic resin composition were measured. The results are shown in Table 6.

COMPARATIVE EXAMPLE 20

Example 20 was repeated except for replacing the AES resin by an ethylene-vinyl acetate copolymer (NUC DQ DJ 3269 manufactured by Nippon Unicar Co., Ltd.), and the properties of the resulting thermoplastic resin composition were measured. The results are shown in Table 6.

COMPARATIVE EXAMPLE 21

Example 20 was repeated except for replacing the AES resin by an ethylene-ethyl acrylate copolymer (NUC 6570 manufactured by Nippon Unicar Co., Ltd.), and the properties of the resulting thermoplastic resin composition were measured. The results are shown in Table 6.

COMPARATIVE EXAMPLE 22

In the case of 100 weight % polycarbonate, the resin's properties were similarly measured. The results are shown in Table 6.

COMPARATIVE EXAMPLE 23

A thermoplastic resin composition was prepared in the same manner as in Example 19 except for reducing the amount of the AES resin to 3 weight %, and its properties were measured. The results are shown in Table 6.

COMPARATIVE EXAMPLE 24

A thermoplastic resin composition was prepared in the same manner as in Example 19 except for increasing the amount of the AES resin to 60 weight % (150 parts by weight per 100 parts by weight of polypropylene+polycarbonate), and its properties were measured. The results are shown in Table 6.

COMPARATIVE EXAMPLE 25

A thermoplastic resin composition was prepared from 50 weight % of the AES resin and 50 weight % of the polycarbonate in the same manner as in Example 19, and its properties were measured. The results are shown in Table 6.

TABLE 6

| Comparative Example No. | Composition (Weight %) | | | | Properties | | | | | |
|---|---|---|---|---|---|---|---|---|---|---|
| | PP[1] | AES[2] | PC[3] | Other | Flexural Modulus (kgf/cm$^2$) | Izod Impact Strength (kgf/cm$^2$) | | Heat Deflection Temperature (°C.) | Dynamic Melt Viscosity (10$^3$ poise) | Solvent Resistance[4] |
| | | | | | | at 23° C. | at −30° C. | | | |
| 17 | 70 | — | 30 | — | 15400 | 3.1 | 3.6 | 133.7 | 3.1 | 0.27 |
| 18 | 50 | — | 50 | — | 15900 | 3.9 | 4.1 | 140.9 | 8.1 | 0.48 |
| 19 | 50 | — | 30 | 20[5] | 15500 | 7.3 | 3.1 | 116.3 | 3.2 | 0.39 |
| 20 | 50 | — | 30 | 20[6] | 10200 | 5.8 | 2.6 | 95.7 | 3.2 | 0.38 |
| 21 | 50 | — | 30 | 20[7] | 8600 | 4.5 | 2.3 | 88.1 | 3.2 | 0.40 |
| 22 | — | — | 100 | — | 19500 | 62.5 | 12.5 | 142.0 | 18 | 1.60 |
| 23 | 67 | 3 | 30 | — | 13800 | 5.2 | 3.4 | 133.5 | 2.8 | 0.37 |
| 24 | 20 | 60 | 20 | — | 17300 | 15.3 | 8.2 | 126.5 | 12 | 0.40 |
| 25 | — | 50 | 50 | — | 16200 | 48.3 | 11.9 | 127.3 | 15 | 0.81 |

Note:
[1]Polypropylene
[2]Graft copolymer produced by grafting styrene and acrylonitrile to ethylene-propylene-diene copolymer (JSR AES 110 manufactured by Japan Synthetic Rubber Co., Ltd.)
[3]Polycarbonate
[4]Weight change by methanol immersion (weight %)
[5]ABS resin (JSR ABS 10 manufactured by Japan Synthetic Rubber Co., Ltd.)
[6]Ethylene-vinyl acetate copolymer (NUC PQ DJ 3269 manufactured by Nippon Unicar Co., Ltd.)
[7]Ethylene-ethyl acrylate copolymer (NUC 6570 manufactured by Nippon Unicar Co., Ltd.)

It is clear from Tables 5 and 6 that the thermoplastic resin compositions of the present invention have much better flexural modulus, impact strength, thermal deformation resistance, moldability (shown by dynamic melt viscosity) and solvent resistance than those outside the scope of the present invention (Comparative Examples).

thermoplastic resin composition were measured. The results are shown in Table 7.

TABLE 7

| Example No. | Composition (Weight %) | | | | | Properties | | | | | |
|---|---|---|---|---|---|---|---|---|---|---|---|
| | PP[1] | PC[2] | AES[3] | SEP[4] | SEBS[5] | Flexural Modulus (kgf/cm²) | Izod Impact Strength (kgf/cm²) | | Heat Deflection Temperature (°C.) | Dynamic Melt Viscosity ×10³ poise) | Surface Peel Resistance | Solvent Resistance[6] |
| | | | | | | | at 23° C. | at −30° C. | | | | |
| 27 | 50 | 30 | 15 | 5 | — | 13900 | 13.9 | 9.0 | 117.6 | 3.0 | 100 | 0.35 |
| 28 | 50 | 30 | 15 | — | 5 | 14200 | 13.6 | 9.2 | 118.5 | 3.0 | 100 | 0.35 |
| 29 | 50 | 30 | 10 | 10 | — | 12600 | 17.8 | 11.4 | 112.4 | 2.9 | 100 | 0.34 |
| 30 | 30 | 50 | 15 | 5 | — | 16800 | 30.4 | 18.6 | 132.0 | 3.3 | 100 | 0.43 |
| 31 | 70 | 20 | 7 | 3 | — | 15000 | 9.2 | 6.9 | 116.0 | 2.9 | 100 | 0.23 |
| 32 | 20 | 70 | 7 | 3 | — | 17600 | 33.6 | 22.4 | 136.7 | 6.8 | 100 | 0.72 |
| 33 | 30 | 40 | 20 | 10 | — | 14100 | 34.5 | 20.6 | 119.4 | 3.3 | 100 | 0.37 |
| 34 | 50[7] | 30 | 15 | 5 | — | 13500 | 15.3 | 10.2 | 110.6 | 3.1 | 100 | 0.35 |

Note:
[1] Polypropylene
[2] Polycarbonate
[3] Graft copolymer produced by grafting styrene and acrylonitrile to ethylene-propylene-diene copolymer (JSR AES 110 manufactured by Japan Synthetic Rubber Co., Ltd.)
[4] Styrene-ethylene · propylene block copolymer (Kraton G 1701 manufactured by Shell Kagaku K.K.)
[5] Styrene-ethylene · butylene-styrene block copolymer (Kraton G 1650 manufactured by Shell Kagaku K.K.)
[6] Weight change by methanol immersion (weight %)
[7] Propylene block copolymer (BJ 309 manufactured by Tonen Sekiyu Kagaku K.K., MFR = 9 g/10 min)

EXAMPLE 27

Crystalline polypropylene (MFR=9.0 g/10 min), a polycarbonate resin (Panlite L 1225 manufactured by Teijin Chemicals, Ltd.), an AES resin (JSR AES 110 manufactured by Japan Synthetic Rubber Co., Ltd.) and a styrene-ethylene-propylene block copolymer (Kraton G 1701, an SEP resin manufactured by Shell Kagaku K.K., a styrene/rubber weight ratio=37/63) were mixed in the proportions shown in Table 7 at room temperature in a Henschel mixer. The resulting mixture was then kneaded at 250° C. in a double-screw extruder to provide composition pellets.

The resulting thermoplastic resin compositions were measured with respect to flexural modulus, Izod impact strength, heat deflection temperature, dynamic melt viscosity, surface peel resistance and solvent resistance (weight change by methanol immersion). The results are shown in Table 7.

EXAMPLE 28

Example 27 was repeated except for replacing the styrene-ethylene-propylene block copolymer by a styrene-ethylene-butylene-styrene block copolymer (Kraton G 1650 manufactured by Shell Kagaku K.K., a styrene/rubber weight ratio=28/72), and the properties of the resulting thermoplastic resin composition were measured. The results are shown in Table 7.

EXAMPLES 29–33

Example 27 was repeated except for changing the proportions of the crystalline polypropylene, the polycarbonate, the graft copolymer (AES resin) and the SEP resin as shown in Table 7, and the properties of the resulting thermoplastic resin compositions were measured. The results are shown in Table 7.

EXAMPLE 34

Example 27 was repeated except for using as the crystalline polypropylene a propylene block copolymer (BJ 309 manufactured by Tonen Sekiyu Kagaku K.K., propylene=92.7 weight %, ethylene=7.3 weight %, MFR=9 g/10 min), and the properties of the resulting

COMPARATIVE EXAMPLES 26, 27

Thermoplastic resin compositions were prepared in the same manner as in Example 27 except for using a two-component system consisting of the crystalline polypropylene and the polycarbonate, and their properties were measured. The results are shown in Table 8.

COMPARATIVE EXAMPLE 28

Only the crystalline polypropylene (MFR=9.0 g/10 min), the polycarbonate resin (Panlite L 1225 manufactured by Teijin Chemicals, Ltd.) and the AES resin (JSR AES 110 manufactured by Japan Synthetic Rubber Co., Ltd.) were mixed in the proportions shown in Table 8 at room temperature in a Henschel mixer. The resulting mixture was then kneaded at 250° C. in a double-screw extruder to provide composition pellets.

The properties of the resulting thermoplastic resin composition was measured in the same manner as in Example 27. The results are shown in Table 8.

COMPARATIVE EXAMPLE 29

Comparative Example 26 was repeated except for replacing the AES resin by a styrene-ethylene-propylene block copolymer (Kraton G 1701 manufactured by Shell Kagaku K.K.), and the properties of the resulting thermoplastic resin composition were measured. The results are shown in Table 8.

COMPARATIVE EXAMPLE 30

Example 27 was repeated except for replacing the styrene-ethylene-propylene block copolymer by an ethylene-propylene rubber (Tafmer P 0180 manufactured by Mitsui Petrochemical Industries, Ltd.), and the properties of the resulting thermoplastic resin composition were measured. The results are shown in Table 8.

COMPARATIVE EXAMPLE 31

Comparative Example 30 was repeated except for replacing the AES resin by an ethylene-vinyl acetate copolymer NUC DQ DJ 3269 manufactured by Nippon Unicar Co., Ltd.), and the properties of the resulting thermoplastic resin composition were measured. The results are shown in Table 8.

COMPARATIVE EXAMPLE 32

Comparative Example 28 was repeated except for replacing the AES resin by an ethylene-ethyl acrylate copolymer NUC 6570 manufactured by Nippon Unicar Co., Ltd.), and the properties of the resulting thermoplastic resin composition were measured. The results are shown in Table 8.

COMPARATIVE EXAMPLE 33

In the case of 100 weight % polycarbonate, the resin's properties were similarly measured. The results are shown in Table 8.

and solvent resistance (weight change by methanol immersion). The results are shown in Table 9.

EXAMPLE 40

Block polypropylene (BJ 309 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content =0.6 weight %, unreacted maleic anhydride content=0) and polybutylene terephthalate (C7000 manufactured by Teijin, Ltd., intrinsic viscosity $[\eta]=1.2$) were mixed in the propor-

TABLE 8

| Comparative Example No. | Composition (Weight %) | | | | | Properties | | | | | |
|---|---|---|---|---|---|---|---|---|---|---|---|
| | PP[1] | PC[2] | AES[3] | SEP[4] | Other | Flexural Modulus (kgf/cm$^2$) | Izod Impact Strength (kgf/cm$^2$) | | Heat Deflection Temperature (°C.) | Dynamic Melt Viscosity ×10$^3$ poise) | Surface Peel Resistance | Solvent Resistance[5] |
| | | | | | | | at 23° C. | at −30° C. | | | | |
| 26 | 70 | 30 | — | — | — | 15400 | 3.1 | 3.6 | 133.7 | 3.1 | 0 | 0.27 |
| 27 | 50 | 50 | — | — | — | 15900 | 3.9 | 4.1 | 140.9 | 8.1 | 0 | 0.48 |
| 28 | 50 | 30 | 20 | — | — | 15600 | 13.2 | 8.2 | 119.0 | 3.2 | 0 | 0.35 |
| 29 | 50 | 30 | — | 20 | — | 8600 | 21.0 | 8.8 | 96.2 | 2.8 | 100 | 0.36 |
| 30 | 50 | 30 | 15 | — | 5[6] | 13900 | 13.5 | 8.0 | 105.6 | 3.2 | 0 | 0.35 |
| 31 | 50 | 30 | — | — | 20[7] | 10200 | 5.8 | 2.6 | 95.7 | 3.2 | 0 | 0.38 |
| 32 | 50 | 30 | — | — | 20[8] | 8600 | 4.5 | 2.3 | 88.1 | 3.2 | 60 | 0.40 |
| 33 | — | 100 | — | — | — | 19500 | 62.5 | 12.5 | 142.0 | 18 | 100 | 1.60 |

Note:
[1]Polypropylene
[2]Polycarbonate
[3]Graft copolymer produced by grafting styrene and acrylonitrile to ethylene-propylene-diene copolymer (JSR AES 110 manufactured by Japan Synthetic Rubber Co., Ltd.)
[4]Styrene-ethylene · propylene block copolymer (Kraton G 1701 manufactured by Shell Kagaku K.K.)
[5]Weight change by methanol immersion (weight %)
[6]Ethylene-propylene rubber (Tafmer P 0180 manufactured by Mitsui Petrochemical Industries, Ltd.)
[7]Ethylene-vinyl acetate copolymer (NUC PQ DJ 3269 manufactured by Nippon Unicar Co., Ltd.)
[8]Ethylene-ethyl acrylate copolymer (NUC 6570 Nippon Unicar Co., Ltd.)

It is clear from Tables 7 and 8 that the thermoplastic resin compositions of the present invention have much better flexural modulus, impact strength, thermal deformation resistance, moldability (shown by dynamic melt viscosity), surface peel resistance and solvent resistance than those outside the scope of the present invention (Comparative Examples).

EXAMPLES 35-39

Crystalline polypropylene (J209 manufactured by Tonen Sekiyu Kagaku K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content=0.6 weight %, unreacted maleic anhydride content=0) and polybutylene terephthalate (C 7000 manufactured by Teijin, Ltd., intrinsic viscosity $[\eta]=1.2$) were dry-blended in the proportions shown in Table 9. Each of the resulting mixtures was kneaded at 280° C. in a double-screw extruder to provide composition pellets.

The resulting thermoplastic resin compositions were formed into test pieces by injection molding at 280° C. and measured with respect to thermal deformation temperature, dynamic melt viscosity, surface peel resistance tions shown in Table 9 and formed into thermoplastic resin composition pellets in the same manner as in Example 35. The resulting thermoplastic resin composition was formed into test pieces by injection molding at 280° C., and their properties were measured in the same manner as in Example 35. The results are shown in Table 9.

EXAMPLE 41

Polypropylene (J209 manufactured by Tonen Sekiyu Kagaku Kogyo K.K., MFR - 9.0 g/10 min), an aromatic polycarbonate resin (Panlite L 1225 manufactured by Teijin Chemicals, Ltd., weight-average molecular weight=22,500), acrylic acid-modified polypropylene (graft content=0.8 weight %, unreacted acrylic acid content=0) and polybutylene terephthalate (C 7000 manufactured by Teijin, Ltd., intrinsic viscosity $[\eta]=1.2$) were mixed in the proportions shown in Table 9 and formed into thermoplastic resin composition pellets in the same manner as in Example 35. The resulting thermoplastic resin composition was formed into test pieces by injection molding at 280° C., and their properties were measured in the same manner as in Example 35. The results are shown in Table 9.

TABLE 9

| Example No. | Composition[1] | | | | Thermal Deformation Temperature (°C.) | Dynamic Melt Viscosity (×10$^3$ poise) | Solvent Resistance[6] | Surface Peel Resistance |
|---|---|---|---|---|---|---|---|---|
| | PP[2] | PC[3] | Modified[4] Polyolefin | PBT[5] | | | | |
| 35 | 25 | 75 | 5 | 5 | 140 | 3.6 | 0.31 | 100 |
| 36 | 50 | 50 | 10 | 10 | 138 | 2.1 | 0.10 | 100 |

TABLE 9-continued

| Example No. | Composition[1] | | | | Properties | | | |
|---|---|---|---|---|---|---|---|---|
| | PP[2] | PC[3] | Modified[4] Polyolefin | PBT[5] | Thermal Deformation Temperature (°C.) | Dynamic Melt Viscosity ($\times 10^3$ poise) | Solvent Resistance[6] | Surface Peel Resistance |
| 37 | 75 | 25 | 5 | 5 | 130 | 1.3 | 0.05 | 100 |
| 38 | 75 | 25 | 10 | 10 | 126 | 1.1 | 0.03 | 100 |
| 39 | 75 | 25 | 15 | 15 | 125 | 0.88 | 0.02 | 100 |
| 40 | 75[7] | 25 | 10 | 10 | 120 | 1.0 | 0.04 | 100 |
| 41 | 75 | 25 | 10[8] | 10 | 125 | 1.2 | 0.03 | 100 |

Note:
[1]Weight % for PP and PC, and parts by weight per 100 parts by weight of PP + PC for modified polyolefin and PBT
[2]Polypropylene
[3]Polycarbonate
[4]Maleic anhydride-modified polypropylene (grafted maleic anhydride = 0.6 weight %)
[5]Polybutylene terephthalate (C 7000 manufactured by Teijin, Ltd.)
[6]Weight change by methanol immersion (weight %)
[7]Block polypropylene (BJ 309 manufactured by Tonen Sekiyu Kagaku K.K., MFR = 9)
[8]Acrylic acid-modified PP (acrylic acid content = 0.8 wt %, no unreactive monomers)

COMPARATIVE EXAMPLE 34

In the case of 100 weight % polypropylene, the resin's properties were similarly measured. The results are shown in Table 10.

COMPARATIVE EXAMPLE 35

In the case of 100 weight % aromatic polycarbonate, the resin's properties were similarly measured. The results are shown in Table 10.

COMPARATIVE EXAMPLES 36, 37

Thermoplastic resin compositions were prepared in the same manner as in Example 35 except for using a two-component system consisting of the crystalline polypropylene and the aromatic polycarbonate, and their properties were measured. The results are shown in Table 10.

COMPARATIVE EXAMPLES 38, 39

Only the polypropylene, the aromatic polycarbonate resin and the modified polyolefin were mixed in the proportions shown in Table 10 at room temperature in a Henschel mixer. Each resulting mixture was then kneaded at 280° C. in a double-screw extruder to provide composition pellets. The properties of the resulting thermoplastic resin compositions were measured in the same manner as in Example 35. The results are shown in Table 10.

COMPARATIVE EXAMPLES 40, 41

Only the polypropylene, the aromatic polycarbonate resin and the polybutylene terephthalate were blended in the proportions shown in Table 10 at 280° C., and the properties of the resulting thermoplastic resin compositions were measured in the same manner as in Example 35. The results are shown in Table 10.

TABLE 10

| Comparative Example No. | Composition[1] | | | | Properties | | | |
|---|---|---|---|---|---|---|---|---|
| | PP[2] | PC[3] | Modified[4] Polyolefin | PBT[5] | Thermal Deformation Temperature (°C.) | Dynamic Melt Viscosity ($\times 10^3$ poise) | Solvent Resistance[6] | Surface Peel Resistance |
| 34 | 100 | — | — | — | 118 | 3.0 | 0 | 100 |
| 35 | — | 100 | — | — | 145 | 18.0 | 1.60 | 100 |
| 36 | 50 | 50 | — | — | 142 | 7.3 | 0.48 | 0 |
| 37 | 75 | 25 | — | — | 133 | 4.7 | 0.20 | 0 |
| 38 | 50 | 50 | 10 | — | 140 | 2.2 | 0.41 | 0 |
| 39 | 75 | 25 | 10 | — | 130 | 1.5 | 0.20 | 0 |
| 40 | 50 | 50 | — | 10 | 136 | 2.8 | 0.12 | 0 |
| 41 | 75 | 25 | — | 10 | 128 | 1.7 | 0.06 | 0 |

Note:
[1]Weight % for PP and PC, and parts by weight per 100 parts by weight of PP + PC for modified polyolefin and PBT
[2]Polypropylene
[3]Polycarbonate
[4]Maleic anhydride-modified polypropylene (grafted maleic anhydride = 0.6 weight %)
[5]Polybutylene terephthalate (C 7000 manufactured by Teijin, Ltd.)
[6]Weight change by methanol immersion (weight %)

It is clear from Tables 9 and 10 that the thermoplastic resin compositions of the present invention have a much better balance of thermal deformation resistance (shown by heat deflection temperature), moldability (shown by dynamic melt viscosity) surface peel resistance and solvent resistance than that outside the scope of the present invention (Comparative Examples).

EXAMPLES 42–46

Crystalline polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), a styrene-maleic, anhydride copolymer (Dylark #332 manufactured by Sekisui Plastics Co., Ltd., MFR=2.0, density=1.10) and 2-isopropenyl-2-oxazoline-modified polypropylene as an oxazoline ring-containing modified polyolefin were dry-blended in the proportions shown in Table 11, and each of the resulting mixtures was then kneaded at 230°

C. in a double-screw extruder to provide composition pellets.

Incidentally, 2-isopropenyl-2-oxazoline-modified polypropylene was prepared by the following method. First, 10 kg of an ethylene-propylene random copolymer (MFR=1) containing 4 weight % of ethylene was prepare thermoplastic resin composition pellets in the same manner as in Example 42. The resulting thermoplastic resin composition pellets were formed into test pieces by injection molding at 230° C., and their properties were measured as in Example 42. The results are shown in Table 11.

TABLE 11

| Example No. | Composition[1] | | | | Properties | | | |
|---|---|---|---|---|---|---|---|---|
| | PP[2] | PC[3] | Modified[4] Polyolefin | SMA[5] | Thermal Deformation Temperature (°C.) | Dynamic Melt Viscosity ($\times 10^3$ poise) | Solvent Resistance[6] | Surface Peel Resistance |
| 42 | 25 | 75 | 5 | 5 | 140 | 10.0 | 0.70 | 100 |
| 43 | 50 | 50 | 10 | 10 | 139 | 6.2 | 0.38 | 100 |
| 44 | 75 | 25 | 5 | 5 | 130 | 4.4 | 0.21 | 100 |
| 45 | 75 | 25 | 10 | 10 | 129 | 4.2 | 0.18 | 100 |
| 46 | 75 | 25 | 15 | 15 | 127 | 4.1 | 0.16 | 100 |
| 47 | 75[7] | 25 | 10 | 10 | 122 | 4.0 | 0.20 | 100 |

Note:
[1]Weight % for PP and PC, and parts by weight per 100 parts by weight of PP + PC for modified polyolefin and SMA.
[2]Polypropylene
[3]Polycarbonate
[4]2-isopropenyl-2-oxazoline-modified polypropylene
[5]Styrene/maleic anhydride copolymer (Dylark #332 manufactured by Sekisui Plastics Co., Ltd.)
[6]Weight change by methanol immersion (weight %)
[7]Block polypropylene (BJ 309 manufactured by Tonen Sekiyu Kagaku K.K., MFR = 9)

mixed with 100 g of 2-isopropenyl-2-oxazoline and 10 ml of Perhexin 25B (manufactured by Nippon Oil And Fats Co., Ltd.), and dry-blended. Each of the resulting blends was kneaded at 200° C. in a double-screw extruder having an inner diameter of 40 mm and an L/D ratio of 24. Unreacted monomer was removed through a vacuum vent (−720 mmHg). As a result of measuring grafted monomer content of the modified polymer by infrared absorption spectrum, it was confirmed that the graft content was $8.1 \times 10^{-5}$ mol/g.

The resulting thermoplastic resin composition pellets were formed into test pieces by injection molding at 230° C. and measured with respect to thermal deformation temperature dynamic melt viscosity, surface peel resistance and solvent resistance (weight change by methanol immersion). The results are shown in Table 11.

EXAMPLE 47

Block polypropylene (BJ 309 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), a styrene-maleic anhydride copolymer (Dylark #332 manufactured by Sekisui Plastics Co., Ltd.) and the same 2-isopropenyl-2-oxazoline-modified polypropylene as in Example 42 were mixed in the proportions shown in Table 11 to

COMPARATIVE EXAMPLES 42, 43

Only the polypropylene, the aromatic polycarbonate resin and the 2-isopropenyl-2-oxazoline-modified polypropylene were mixed in the proportions shown in Table 12 at room temperature in a Henschel mixer. Each of the resulting mixtures was then kneaded at 230° C. in a double-screw extruder to provide composition pellets. The properties of the resulting thermoplastic resin compositions were measured in the same manner as in Example 42. The results are shown in Table 12.

COMPARATIVE EXAMPLES 44, 45

Only the polypropylene, the aromatic polycarbonate resin and the styrene-maleic anhydride copolymer (Dylark #332 manufactured by Sekisui Plastics Co., Ltd.) were blended in the proportions shown in Table 12 at 230° C. to prepare thermoplastic resin composition pellets, and their properties were measured in the same manner as in Example 42. The results are shown in Table 12.

TABLE 12

| Comparative Example No. | Composition[1] | | | | Properties | | | |
|---|---|---|---|---|---|---|---|---|
| | PP[2] | PC[3] | Modified[4] Polyolefin | SMA[5] | Thermal Deformation Temperature (°C.) | Dynamic Melt Viscosity ($\times 10^3$ poise) | Solvent Resistance[6] | Surface Peel Resistance |
| 42 | 50 | 50 | 10 | — | 138 | 5.9 | 0.45 | 0 |
| 43 | 75 | 25 | 10 | — | 127 | 4.2 | 0.20 | 0 |
| 44 | 50 | 50 | — | 10 | 140 | 7.6 | 0.48 | 0 |
| 45 | 75 | 25 | — | 10 | 128 | 5.0 | 0.22 | 0 |

Note:
[1]Weight % for PP and PC, and parts by weight per 100 parts by weight of PP + PC for modified polyolefin and SMA.
[2]Polypropylene
[3]Polycarbonate
[4]2-isopropenyl-2-oxazoline-modified polypropylene
[5]Styrene/maleic anhydride copolymer (Dylark #332 manufactured by Sekisui Plastics Co., Ltd.)
[6]Weight change by methanol immersion (weight %)

It is clear from Tables 11 and 12 that the thermoplastic resin compositions of the present invention have a much better balance of thermal deformation resistance (shown by heat deflection temperature), moldability (shown by dynamic melt viscosity) surface peel resistance and solvent resistance than that outside the scope of the present invention (Comparative Examples).

EXAMPLES 48–52

Crystalline polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content=0.6 weight %, unreacted maleic anhydride content=0) and a reactive polystyrene (RPS manufactured by Dow Chemical, oxazoline ring-containing monomer content=about 1 weight %) as a styrene/oxazoline ring-containing monomer copolymer were dry-blended in the proportions shown in Table 13 and kneaded at 230° C. in a double-screw extruder to provide composition pellets. The resulting thermoplastic resin composition pellets were formed into test pieces by injection molding at 230° C. and measured with respect to thermal deformation temperature, dynamic melt viscosity, surface peel resistance and solvent resistance (weight change by methanol immersion). The results are shown in Table 13.

EXAMPLE 53

Block polypropylene (BJ 309 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content=0.6 weight %, unreacted maleic anhydride content=0) and a reactive polystyrene(RPS manufactured by Dow Chemical, oxazoline ring-containing monomer content=about 1 weight %) were dry-blended in the proportions shown in Table 13 to prepare thermoplastic resin composition pellets in the same manner as in Example 48. The resulting thermoplastic resin composition pellets were formed into test pieces by injection molding at 230° C., and their properties were measured as in Example 48. The results are shown in Table 13.

EXAMPLE 54

Polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), an acrylic acid-modified polypropylene (graft content - 0.8 weight %, unreacted acrylic acid content=0) and a reactive polystyrene (RPS manufactured by Dow Chemical, oxazoline ring-containing monomer content=about 1 weight %) were dry-blended in the proportions shown in Table 13 to prepare thermoplastic resin composition pellets in the same manner as in Example 48. The resulting thermoplastic resin composition pellets were formed into test pieces by injection molding at 230° C., and their properties were measured as in Example 48. The results are shown in Table 13.

TABLE 13

| Example No. | Composition[1] | | | | Properties | | | |
| --- | --- | --- | --- | --- | --- | --- | --- | --- |
| | PP[2] | PC[3] | Modified[4] Polyolefin | Styrene Copolymer[5] | Thermal Deformation Temperature (°C.) | Dynamic Melt Viscosity ($\times 10^3$ poise) | Solvent Resistance[6] | Surface Peel Resistance |
| 48 | 25 | 75 | 5 | 5 | 143 | 9.9 | 0.72 | 100 |
| 49 | 50 | 50 | 10 | 10 | 140 | 6.0 | 0.40 | 100 |
| 50 | 75 | 25 | 5 | 5 | 130 | 4.8 | 0.25 | 100 |
| 51 | 75 | 25 | 10 | 10 | 130 | 4.3 | 0.20 | 100 |
| 52 | 75 | 25 | 15 | 15 | 128 | 3.8 | 0.17 | 100 |
| 53 | 75[7] | 25 | 10 | 10 | 128 | 4.3 | 0.23 | 100 |
| 54 | 75 | 25 | 10[8] | 10 | 130 | 4.4 | 0.20 | 100 |

Note:
[1] Weight % for PP and PC, and parts by weight per 100 parts by weight of PP + PC for modified polyolefin and styrene copolymer.
[2] Polypropylene
[3] Polycarbonate
[4] Maleic anhydride-modified polypropylene (grafted maleic anhydride = 0.6 weight %)
[5] Reactive polystyrene (RPS, manufactured by Dow Chemical, oxazoline ring-containing monomer = about 1 weight %)
[6] Weight change by methanol immersion (weight %)
[7] Block polypropylene (BJ 309 manufactured by Tonen Sekiyu Kagaku K.K., MFR = 9)
[8] Acrylic acid-modified PP (acrylic acid content = 0.8 wt %, no unreactive monomers)

COMPARATIVE EXAMPLES 46, 47

Only the polypropylene, the aromatic polycarbonate resin and the modified polyolefin were mixed in the proportions shown in Table 14 at room temperature in a Henschel mixer. Each of the resulting mixtures was then kneaded at 230° C. in a double-screw extruder to provide composition pellets. The properties of the resulting thermoplastic resin compositions were measured in the same manner as in Example 48. The results are shown in Table 14.

COMPARATIVE EXAMPLES 48, 49

Only the polypropylene, the aromatic polycarbonate resin and the oxazoline ring-containing styrene copolymer were blended in the proportions shown in Table 14 at 230° C. to prepare thermoplastic resin composition pellets, and their properties were measured in the same manner as in Example 48. The results are shown in Table 14.

TABLE 14

| Example No. | Composition[1] | | | | Properties | | | |
| --- | --- | --- | --- | --- | --- | --- | --- | --- |
| | PP[2] | PC[3] | Modified[4] Polyolefin | Styrene Copolymer[5] | Thermal Deformation Temperature (°C.) | Dynamic Melt Viscosity ($\times 10^3$ poise) | Solvent Resistance[6] | Surface Peel Resistance |
| 46 | 50 | 50 | 10 | — | 140 | 5.9 | 0.41 | 0 |

TABLE 14-continued

| Example No. | Composition[1] | | | | Properties | | | |
| --- | --- | --- | --- | --- | --- | --- | --- | --- |
| | PP[2] | PC[3] | Modified[4] Polyolefin | Styrene Copolymer[5] | Thermal Deformation Temperature (°C.) | Dynamic Melt Viscosity ($\times 10^3$ poise) | Solvent Resistance[6] | Surface Peel Resistance |
| 47 | 75 | 25 | 10 | — | 130 | 3.9 | 0.20 | 0 |
| 48 | 50 | 50 | — | 10 | 140 | 7.4 | 0.45 | 0 |
| 49 | 75 | 25 | — | 10 | 130 | 4.8 | 0.25 | 0 |

Note:
[1]Weight % for PP and PC, and parts by weight per 100 parts by weight of PP + PC for modified polyolefin and styrene copolymer.
[2]Polypropylene
[3]Polycarbonate
[4]Maleic anhydride-modified polypropylene (grafted maleic anhydride = 0.6 weight %)
[5]Reactive polystyrene (RPS manufactured by Dow Chemical, oxazoline ring-containing monomer = about 1 weight %)
[6]Weight change by methanol immersion (weight %)

It is clear from Tables 13 and 14 that the thermoplastic resin compositions of the present invention have a much better balance of thermal deformation resistance (shown by heat deflection temperature), moldability (shown by dynamic melt viscosity), surface peel resistance and solvent resistance than that outside the scope of the present invention (Comparative Examples).

EXAMPLES 55-59

Crystalline polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22.500), maleic anhydride-modified polypropylene (graft content=0.6 weight %, unreacted maleic anhydride content=0) and a saponified ethylene-vinyl acetate copolymer (95%-saponified ethylene-vinyl acetate copolymer (MB-600 manufactured by Nippon Unicar Co., Ltd., vinyl acetate content=35 weight %, MI=35 g/10 min, density=0.96 g/ml)) were dry-blended in the proportions shown in Table 15, and kneaded at 230° C. in a double-screw extruder to provide composition pellets. The resulting thermoplastic resin composition pellets were formed into test pieces by injection molding at 230° C. and measured with respect to thermal deformation temperature, dynamic melt viscosity, surface peel resistance and solvent resistance (weight change by methanol immersion). The results are shown in Table 15.

EXAMPLE 60

Block polypropylene (BJ 309 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content=0.6 weight %, unreacted maleic anhydride content=0) and a saponified ethylene-vinyl acetate copolymer (95 %-saponified ethylene-vinyl acetate copolymer (MB-600 manufactured by Nippon Unicar Co, Ltd., vinyl acetate content=35 weight %, MI=35 g/10 min, density=0.96 g/ml)) were dry-blended in the proportions shown in Table 15 to prepare thermoplastic resin composition pellets. The resulting thermoplastic resin composition pellets were formed into test pieces by injection molding at 230° C., and their properties were measured as in Example 55. The results are shown in Table 15.

EXAMPLE 61

Polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), acrylic acid-modified polypropylene (graft content=0.8 weight %, unreacted acrylic acid content=0) and a saponified ethylene-vinyl acetate copolymer (95%-saponified ethylene-vinyl acetate copolymer (MB-600 manufactured by Nippon Unicar Co., Ltd., vinyl acetate content=35 weight %, MI=35 g/10 min, density=0.96 g/ml)) were dry-blended in the proportions shown in Table 15 to prepare thermoplastic resin composition pellets. The resulting thermoplastic resin composition pellets were formed into test pieces by injection molding at 230° C., and their properties were measured as in Example 55. The results are shown in Table 15.

TABLE 15

| Example No. | Composition[1] | | | | Properties | | | |
| --- | --- | --- | --- | --- | --- | --- | --- | --- |
| | PP[2] | PC[3] | Modified[4] Polyolefin | Saponified EVA[5] | Thermal Deformation Temperature (°C.) | Dynamic Melt[6] Viscosity ($\times 10^3$ poise) | Solvent Resistance[7] | Surface Peel Resistance |
| 55 | 25 | 75 | 5 | 5 | 140 | 23 | 0.30 | 100 |
| 56 | 50 | 50 | 10 | 10 | 136 | 12 | 0.12 | 100 |
| 57 | 75 | 25 | 5 | 5 | 130 | 11 | 0.05 | 100 |
| 58 | 75 | 25 | 10 | 10 | 128 | 9.3 | 0.05 | 100 |
| 59 | 75 | 25 | 15 | 15 | 126 | 7.7 | 0.04 | 100 |
| 60 | 75[8] | 25 | 10 | 10 | 122 | 9.0 | 0.05 | 100 |

TABLE 15-continued

| Example No. | Composition[1] | | | | Properties | | | |
|---|---|---|---|---|---|---|---|---|
| | PP[2] | PC[3] | Modified[4] Polyolefin | Saponified EVA[5] | Thermal Deformation Temperature (°C.) | Dynamic Melt[6] Viscosity (×10³ poise) | Solvent Resistance[7] | Surface Peel Resistance |
| 61 | 75 | 25 | 10[9] | 10 | 126 | 9.6 | 0.05 | 100 |

Note:
[1]Weight % for PP and PC, and parts by weight per 100 parts by weight of PP + PC for modified polyolefin and saponified EVA
[2]Polypropylene
[3]Polycarbonate
[4]Maleic anhydride-modified polypropylene (grafted maleic anhydride = 0.6 weight %)
[5]Saponified ethylene-vinyl acetate copolymer (saponified product of MB-600 manufactured by Nippon Unicar Co., Ltd., saponification degree = 95%)
[6]Measured at 230° C. and 100 rad/sec.
[7]Weight change by methanol immersion (weight %)
[8]Block polypropylene (BJ 309 manufactured by Tonen Sekiyu Kagaku K.K., MFR = 9)
[9]Acrylic acid-modified PP (acrylic acid content = 0.8 wt %, no unreactive monomers)

COMPARATIVE EXAMPLE 50

In the case of 100 weight % polypropylene, the resin's properties were similarly measured. The results are shown in Table 16.

COMPARATIVE EXAMPLE 51

In the case of 100 weight % aromatic polycarbonate, the resin's properties were similarly measured. The results are shown in Table 16.

COMPARATIVE EXAMPLES 52, 53

Thermoplastic resin compositions were prepared in the same manner as in Example 55 except for using a two-component system consisting of the crystalline polypropylene and the aromatic polycarbonate, and their properties were measured. The results are shown in Table 16.

COMPARATIVE EXAMPLES 54, 55

Only the polypropylene, the aromatic polycarbonate resin and the modified polyolefin were mixed in the proportions shown in Table 16 at room temperature in a Henschel mixer. Each of the resulting mixtures was then kneaded at 230° C. in a double-screw extruder to provide composition pellets. The properties of the resulting thermoplastic resin compositions were measured in the same manner as in Example 55. The results are shown in Table 16.

COMPARATIVE EXAMPLES 56, 57

Only the polypropylene, the aromatic polycarbonate resin and the saponified ethylene-vinyl acetate copolymer were blended and kneaded in the proportions shown in Table 16 at 230° C. to prepare thermoplastic resin composition pellets, and their properties were measured in the same manner as in Example 55. The results are shown in Table 16.

TABLE 16

| Comparative Example No. | Composition[1] | | | | Properties | | | |
|---|---|---|---|---|---|---|---|---|
| | PP[2] | PC[3] | Modified[4] Polyolefin | Saponified EVA[5] | Thermal Deformation Temperature (°C.) | Dynamic Melt[6] Viscosity (×10³ poise) | Solvent[7] Resistance | Surface Peel Resistance |
| 50 | 100 | — | — | — | 118 | 7.6 | 0 | 100 |
| 51 | — | 100 | — | — | 145 | 45 | 1.60 | 100 |
| 52 | 50 | 50 | — | — | 142 | 18 | 0.48 | 0 |
| 53 | 75 | 25 | — | — | 133 | 13 | 0.20 | 0 |
| 54 | 50 | 50 | 10 | — | 140 | 13 | 0.41 | 0 |
| 55 | 75 | 25 | 10 | — | 130 | 10 | 0.20 | 0 |
| 56 | 50 | 50 | — | 10 | 138 | 17 | 0.14 | 5 |
| 57 | 75 | 25 | — | 10 | 126 | 12 | 0.05 | 25 |

Note:
[1]Weight % for PP and PC, and parts by weight per 100 parts by weight of PP + PC for modified polyolefin and saponified EVA.
[2]Polypropylene
[3]Polycarbonate
[4]Maleic anhydride-modified polypropylene (grafted maleic anhydride = 0.6 weight %)
[5]Saponified ethylene-vinyl acetate copolymer (saponified product of MB-600 manufactured by Nippon Unicar Co., Ltd., saponification degree = 95%)
[6]Measured at 230° C. and 100 rad/sec.
[7]Weight change by methanol immersion (weight %)

It is clear from Tables 15 and 16 that the thermoplastic resin compositions of the present invention have a much better balance of thermal deformation resistance (shown by heat deflection temperature), moldability (shown by dynamic melt viscosity), surface peel resistance and solvent resistance than that outside the scope of the present invention (Comparative Examples).

EXAMPLES 62-66

Crystalline polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content=0.6 weight %, unreacted maleic anhydride content=0) and a copolymer consisting of 20 weight % of glycidyl methacrylate, 60 weight % of styrene and 20 weight % of acrylonitrile (Blemmer CP20 SA manufactured by Nippon Oil And Fats Co., Ltd.) were dry-blended in the proportions shown in Table 17 and kneaded at 230° C. in a double-screw extruder to provide composition pellets.

The resulting thermoplastic resin composition pellets were formed into test pieces by injection molding at 230° C. and measured with respect to thermal deformation temperature, dynamic melt viscosity, surface peel resistance and solvent resistance (weight change by methanol immersion). The results are shown in Table 17.

EXAMPLE 67

Block polypropylene (BJ 309 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22,500), maleic anhydride-modified polypropylene (graft content=0.6 weight %, unreacted maleic anhydride content=0) and a copolymer consisting of 20 weight % of glycidyl methacrylate, 60 weight % of styrene and 20 weight % of acrylonitrile (Blemmer CP20 SA manufactured by Nippon Oil And Fats Co., Ltd.) were dry-blended in the proportions shown in Table 17 to prepare thermoplastic resin composition pellets in the same manner as in Example 62. The resulting thermoplastic resin composition pellets were formed into test pieces by injection molding at 230° C., and their properties were measured as in Example 62. The results are shown in Table 17.

EXAMPLE 68

Polypropylene (J209 manufactured by Tonen Sekiyu Kagaku Kogyo K.K., MFR=9.0 g/10 min), an aromatic polycarbonate resin (Panlite L 1225 manufactured by Teijin Chemicals, Ltd., weight-average molecular weight=22.500), acrylic acid-modified polypropylene (graft content=0.8 weight %, unreacted acrylic acid content=0) and a copolymer consisting of 20 weight % of glycidyl methacrylate, 60 weight % of styrene and 20 weight % of acrylonitrile (Blemmer CP20 SA manufactured by Nippon Oil And Fats Co., Ltd.) were dry-blended in the proportions shown in Table 17 to prepare thermoplastic resin composition pellets in the same manner as in Example 62. The resulting thermoplastic resin composition pellets were formed into test pieces by injection molding at 230° C., and their properties were measured as in Example 62. The results are shown in Table 17.

TABLE 17

| Example No. | Composition[1] | | | | Properties | | | |
|---|---|---|---|---|---|---|---|---|
| | PP[2] | PC[3] | Modified[4] Polyolefin | Styrene Copolymer[5] | Thermal Deformation Temperature (°C.) | Dynamic Melt Viscosity (×10³ poise) | Solvent Resistance[6] | Surface Peel Resistance |
| 62 | 25 | 75 | 5 | 5 | 142 | 7.9 | 0.68 | 100 |
| 63 | 50 | 50 | 10 | 10 | 140 | 3.9 | 0.38 | 100 |
| 64 | 75 | 25 | 5 | 5 | 132 | 3.5 | 0.20 | 100 |
| 65 | 75 | 25 | 10 | 10 | 130 | 2.6 | 0.18 | 100 |
| 66 | 75 | 25 | 15 | 15 | 130 | 2.0 | 0.16 | 100 |
| 67 | 75[7] | 25 | 10 | 10 | 128 | 2.5 | 0.20 | 100 |
| 68 | 75 | 25 | 10[8] | 10 | 131 | 2.7 | 0.18 | 100 |

Note:
[1]Weight % for PP and PC, and parts by weight per 100 parts by weight of PP + PC for modified polyolefin and styrene copolymer.
[2]Polypropylene
[3]Polycarbonate
[4]Maleic anhydride-modified polypropylene (grafted maleic anhydride = 0.6 weight %)
[5]Blemmer CP 20 SA manufactured by Nippon Oil and Fats Co., Ltd.
[6]Weight change by methanol immersion (weight %)
[7]Block polypropylene (BJ 309 manufactured by Tonen Sekiyu Kagaku K.K., MFR = 9)
[8]Acrylic acid-modified PP (acrylic acid content = 0.8 wt %, no unreactive monomers)

COMPARATIVE EXAMPLES 58, 59

Only the polypropylene, the aromatic polycarbonate resin and the modified polyolefin were mixed in the proportions shown in Table 18 at room temperature in a Henschel mixer. Each of the resulting mixtures was then kneaded at 230° C. in a double-screw extruder to provide composition pellets. The properties of the resulting thermoplastic resin compositions were measured in the same manner as in Example 62. The results are shown in Table 18.

COMPARATIVE EXAMPLES 60, 61

Only the polypropylene, the aromatic polycarbonate resin and the epoxy group-containing styrene copolymer were blended and kneaded in the proportions shown in Table 18 at 230° C. to prepare thermoplastic resin composition pellets, and their properties were measured in the same manner as in Example 62. The results are shown in Table 18.

TABLE 18

| Comparative Example No. | Composition[1] | | | | Properties | | | |
|---|---|---|---|---|---|---|---|---|
| | PP[2] | PC[3] | Modified[4] Polyolefin | Styrene Copolymer[5] | Thermal Deformation Temperature (°C.) | Dynamic Melt Viscosity (×10³ poise) | Solvent Resistance[6] | Surface Peel Resistance |
| 58 | 50 | 50 | 10 | — | 140 | 5.9 | 0.41 | 0 |
| 59 | 75 | 25 | 10 | — | 130 | 3.9 | 0.20 | 0 |
| 60 | 50 | 50 | — | 10 | 140 | 4.7 | 0.41 | 0 |

TABLE 18-continued

| Comparative Example No. | Composition[1] | | | | Properties | | | |
|---|---|---|---|---|---|---|---|---|
| | PP[2] | PC[3] | Modified[4] Polyolefin | Styrene Copolymer[5] | Thermal Deformation Temperature (°C.) | Dynamic Melt Viscosity (×$10^3$ poise) | Solvent Resistance[6] | Surface Peel Resistance |
| 61 | 75 | 25 | — | 10 | 130 | 2.2 | 0.20 | 0 |

Note:
[1]Weight % for PP and PC, and parts by weight per 100 parts by weight of PP + PC for modified polyolefin and styrene copolymer.
[2]Polypropylene
[3]Polycarbonate
[4]Maleic anhydride-modified polypropylene (grafted maleic anhydride = 0.6 weight %)
[5]Blemmer CP 20 SA manufactured by Nippon Oil and Fats Co., Ltd.
[6]Weight change by methanol immersion (weight %)

It is clear from Tables 17 and 18 that the thermoplastic resin compositions of the present invention have a much better balance of thermal deformation resistance (shown by heat deflection temperature), moldability (shown by dynamic melt viscosity), surface peel resistance and solvent resistance than that outside the scope of the present invention (Comparative Examples).

As described above in detail, since the thermoplastic resin composition of the present invention contains the above-described additional components, the compatibility between the polycarbonate and the polyolefin is improved. Accordingly, it has well-balanced properties such as mechanical strength, impact strength, thermal deformation resistance, surface peel resistance, moldability, chemical resistance, etc. The thermoplastic resin composition of the present invention having such properties are highly suitable as engineering plastic materials for parts of automobiles, electric appliances, etc.

The present invention has been explained referring to Examples, but it should be noted that any modifications can be made unless they deviate from the scope of the present invention as defined by the claims attached hereto.

What is claimed is:

1. A thermoplastic resin composition consisting essentially of:
   (a) 95-5 weight % of crystalline polyolefin,
   (b) 5-95 weight % of polycarbonate, and
   (c) 5-100 parts by weight, per 100 parts by weight of said (a) + said (b), of a
   styrene-ethylene-propylene block copolymer having a single styrene block and a single ethylene-propylene block.

2. The thermoplastic resin composition according to claim 1, wherein said crystalline polyolefin is polypropylene.

3. The thermoplastic resin composition according to claim 1, wherein said crystalline polyolefin is 90-10 weight % and said polycarbonate is 10-90 weight %.

4. The thermoplastic resin composition according to claim 1, wherein said styrene-ethylene-propylene block copolymer is 10-50 parts by weight.

5. A thermoplastic resin composition comprising:
   (a) 95-5 weight % of crystalline polyolefin,
   (b) 5-95 weight % of polycarbonate,
   (c) a styrene-ethylene butylene-styrene block copolymer, and
   (d) a low-crystallinity ethylene-α-olefin copolymer having a crystallinity of 20% or less, said (c) + said (d) being 5-100 parts by weight per 100 parts weight of said (a) + said (b), and a weight ratio of said (c) to said (d) being 30/70-95/5.

6. The thermoplastic resin composition according to claim 5, wherein said crystalline polyolefin is polypropylene.

7. The thermoplastic resin composition according to claim 5, wherein said crystalline polyolefin is 90-10 weight % and said polycarbonate is 10-90 weight %.

8. The thermoplastic resin composition according to claim 5, wherein said styrene-ethylene-butylene-styrene block copolymer contains 10-70 weight % of a styrene block and 90-30 weight % of an ethylene-butylene block.

9. The thermoplastic resin composition according to claim 5, wherein said low-crystallinity ethylene-α-olefin copolymer is an ethylene-propylene rubber or an ethylene-butylene rubber.

10. The thermoplastic resin composition according to claim 5, wherein said (c) + said (d) is 10-50 parts by weight per 100 parts by weight of said (a) + said (b).

11. The thermoplastic resin composition according to claim 5, wherein a weight ratio of said (c) to said (d) is 50/50-90/10.

12. A thermoplastic resin composition comprising:
   (a) 95-5 weight % of crystalline polyolefin,
   (b) 5-95 weight % of polycarbonate,
   (c) a graft copolymer composed of an ethylene-propylene-diene copolymer or an ethylene-propylene copolymer grafted with a styrene monomer and an acrylonitrile monomer, and
   (d) a styrene-olefin block copolymer, said (c) + said (d) being 5-100 parts by weight per 100 parts by weight of said (a + said (b), and a weight ratio of said (c) to said (d) being 30/70-95/5.

13. The thermoplastic resin composition according to claim 12, wherein said crystalline polyolefin is polypropylene.

14. The thermoplastic resin composition according to claim 12, wherein said crystalline polyolefin is 90-10 weight % and said polycarbonate is 10-90 weight %.

15. The thermoplastic resin composition according to claim 12, wherein a total of said graft copolymer (c) and said styrene-olefin block copolymer (d) is 10-50 parts by weight.

16. The thermoplastic resin composition according to claim 12, wherein a styrene/acrylonitrile graft moiety in said graft copolymer contains 95-50 weight % of a styrene monomer and 5-50 weight % of an acrylonitrile monomer.

17. The thermoplastic resin composition according to claim 12, wherein said styrene-olefin block copolymer is a styrene-ethylene-butylene-styrene block copolymer and/or a styrene-ethylene propylene block copolymer.

18. The thermoplastic resin composition according to claim 17, wherein said styrene-olefin block copolymer is a styrene-ethylene-propylene block copolymer.

19. The thermoplastic resin composition according to claim 12, wherein a weight ratio of said graft copolymer (c) to said styrene-olefin block copolymer (d) is 50/50-90/10.

20. A thermoplastic resin composition comprising:
(a) 95-5 weight % of crystalline polyolefin,
(b) 5-95 weight % of polycarbonate, and
(c) 2-100 parts by weight, per 100 parts by weight of said (a) + said (b), of a modified polyolefin, and
(d) 2-100 parts by weight, per 100 parts by weight of said (a) + said (b), of polybutylene terephthalate.

21. The thermoplastic resin composition according to claim 20, wherein said crystalline polyolefin is polypropylene.

22. The thermoplastic resin composition according to claim 20, wherein said crystalline polyolefin is 90-10 weight % and said polycarbonate is 10-90 weight %.

23. The thermoplastic resin composition according to claim 20, wherein said modified polyolefin is a polyolefin modified with unsaturated carboxylic acid or its anhydride.

24. The thermoplastic resin composition according to claim 23, wherein said modified polyolefin contains 0.1-10 weight % of unsaturated carboxylic acid or its anhydride.

25. The thermoplastic resin composition according to claim 20, wherein said modified polyolefin is 5-50 parts by weight per 100 parts by weight of said polycartonate + said polyolefin.

26. The thermoplastic resin composition according to claim 20, wherein said polybutylene terephthalate is 5-50 parts by weight per 100 parts by weight of said polycarbonate + said polyolefin.

27. A thermoplastic resin composition comprising:
(a) 95-5 weight % of crystalline polyolefin,
(b) 5-95 weight % of polycarbonate,
(c) 2-100 parts by weight, per 100 parts by weight of said (a) + said (b), of a styrene-maleic anhydride copolymer, and
(d) 2-20 parts by weight, per 100 parts by weight of said (a) + said (b), of a modified polyolefin containing an oxazoline ring.

28. The thermoplastic resin composition according to claim 27, wherein said crystalline polyolefin is polypropylene or a copolymer of propylene and another α-olefin.

29. The thermoplastic resin composition according to claim 27, wherein said crystalline polyolefin is 90-10 weight % and said polycarbonate is 10-90 weight %.

30. The thermoplastic resin composition according to claim 27, wherein said styrene-maleic anhydride copolymer contains 1-20 weight % of maleic anhydride.

31. The thermoplastic resin composition according to claim 27, wherein said oxazoline ring-containing modified polyolefin contains 0.1-10 weight % of an oxazoline ring-containing monomer.

32. The thermoplastic resin composition according to claim 27, wherein said styrene-maleic anhydride copolymer is 5-20 parts by weight per 100 parts by weight of said polycarbonate + said polyolefin.

33. The thermoplastic resin composition according to claim 27, wherein said oxazoline ring-containing modified polyolefin is 5-15 parts by weight per 100 parts by weight of said polycarbonate + said polyolefin.

34. A thermoplastic resin composition comprising:
(a) 95-5 weight % of crystalline polyolefin,
(b) 5-95 weight % of polycarbonate,
(c) 2-30 parts by weight, per 100 parts by weight of said (a) + said (b), of a modified polyolefin, and
(d) 2-30 parts by weight, per 100 parts by weight of said (a) + said (b), of a styrene copolymer containing an oxazoline ring.

35. The thermoplastic resin composition according to claim 34, wherein said crystalline polyolefin is polypropylene or a copolymer of propylene and another α-olefin.

36. The thermoplastic resin composition according to claim 34, wherein said crystalline polyolefin is 90-10 weight % and said polycarbonate is 10-90 weight %.

37. The thermoplastic resin composition according to claim 34, wherein said modified polyolefin is a polyolefin modified with unsaturated carboxylic acid or its anhydride.

38. The thermoplastic resin composition according to claim 37, wherein said modified polyolefin contains 0.1-10 weight % of unsaturated carboxylic acid or its anhydride.

39. The thermoplastic resin composition according to claim 34, wherein said oxazoline ring-containing styrene copolymer is based on an oxazoline ring-containing monomer and a styrene monomer, and said oxazoline ring-containing monomer is 0.1-10 weight %.

40. The thermoplastic resin composition according to claim 34, wherein said modified polyolefin is 5-15 parts by weight per 100 parts by weight of said polycarbonate + said polyolefin.

41. The thermoplastic resin composition according to claim 34, wherein said oxazoline ring-containing styrene copolymer is 5-15 parts by weight per 100 parts by weight of said polycarbonate + said polyolefin.

42. A thermoplastic resin composition comprising:
(a) 95-5 weight % of crystalline polyolefin,
(b) 5-95 weight % of polycarbonate,
(c) 2-30 parts by weight, per 100 parts by weight of said (a) + said (b), of a modified polyolefin, and
(d) 2-100 parts by weight, per 100 parts by weight of said (a) + said (b), of a saponified olefin-vinyl ester copolymer.

43. The thermoplastic resin composition according to claim 42, wherein said crystalline polyolefin is polypropylene or a copolymer of propylene and another α-olefin.

44. The thermoplastic resin composition according to claim 42, wherein said crystalline polyolefin is 90-10 weight % and said polycarbonate is 10-90 weight %.

45. The thermoplastic resin composition according to claim 42, wherein said modified polyolefin is a polyolefin modified with unsaturated carboxylic acid or its anhydride.

46. The thermoplastic resin composition according to claim 45, wherein said modified polyolefin contains 0.1-10 weight % of unsaturated carboxylic acid or its anhydride.

47. The thermoplastic resin composition according to claim 42, wherein said saponified olefin-vinyl ester copolymer has 70% or more of saponification degree.

48. The thermoplastic resin composition according to claim 42, wherein said saponified olefin-vinyl ester copolymer is a saponified ethylene-vinyl acetate copolymer having 10-70 weight % of vinyl acetate content.

49. The thermoplastic resin composition according to claim 42, wherein said modified polyolefin is 5-20 parts by weight per 100 parts by weight of said polycarbonate + said polyolefin.

50. The thermoplastic resin composition according to claim 42, wherein said saponified olefin-vinyl ester copolymer is 5-50 parts by weight per 100 parts by weight of said polycarbonate + said polyolefin.

51. A thermoplastic resin composition comprising:
   (a) 95-5 weight % of crystalline polyolefin,
   (b) 5-95 weight % of polycarbonate,
   (c) 2-30 parts by weight, per 100 parts by weight of said (a) + said (b), of a modified polyolefin, and
   (d) 2-30 parts by weight, per 100 parts by weight of said (a) + said (b), of an epoxy group-containing styrene copolymer.

52. The thermoplastic resin composition according to claim 51, wherein said crystalline polyolefin is polypropylene or a copolymer of propylene and another α-olefin.

53. The thermoplastic resin composition according to claim 51, wherein said crystalline polyolefin is 90-10 weight % and said polycarbonate is 10-90 weight %.

54. The thermoplastic resin composition according to claim 51, wherein said modified polyolefin is a polyolefin modified with unsaturated carboxylic acid or its anhydride.

55. The thermoplastic resin composition according to claim 54, wherein said modified polyolefin contains 0.1-10 weight % of unsaturated carboxylic acid or its anhydride.

56. The thermoplastic resin composition according to claim 51, wherein said epoxy group-containing styrene copolymer is composed of 1-50 mol % of an unsaturated epoxy compound, 50-94 mol % of a styrene monomer and 5-20 mol % of an acrylic monomer.

57. The thermoplastic resin composition according to claim 51, wherein said modified polyolefin is 5-20 parts by weight per 100 parts by weight of said polycarbonate and said polyolefin.

58. The thermoplastic resin composition according to claim 51, wherein said epoxy group-containing styrene copolymer is 5-20 parts by weight per 100 parts by weight of said polycarbonate + said polyolefin.

* * * * *

UNITED STATES PATENT AND TRADEMARK OFFICE
CERTIFICATE OF CORRECTION

PATENT NO. : 5,021,504

DATED : June 4, 1991

INVENTOR(S) : FUJITA ET AL.

It is certified that error appears in the above-identified patent and that said Letters Patent is hereby corrected as shown below:

In the Abstract:

line 5, change "styrene-ethylene.propylene" to --styrene-ethylene·propylene--;

line 6, change "rene-ethylene." to --rene-ethylene·--.

In the Claims:

Claim 5, Col. 41, line 62, change "styrene-ethylene butylene-styrene" to --styrene-ethylene·butylene-styrene--.

Claim 12, Col. 42, line 45, change "(a" to --(a)--.

Claim 20, Col. 43, line 9, change "(a" to --(a)--.

Claim 34, Col. 44, line 2, change "(a" to --(a)--.

Signed and Sealed this

Twenty-second Day of September, 1992

Attest:

DOUGLAS B. COMER

Attesting Officer      Acting Commissioner of Patents and Trademarks